US008687644B2

(12) United States Patent
Nonaka

(10) Patent No.: US 8,687,644 B2
(45) Date of Patent: Apr. 1, 2014

(54) PACKET TRANSFER DEVICE

(75) Inventor: Naomichi Nonaka, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 569 days.

(21) Appl. No.: 12/989,014

(22) PCT Filed: Nov. 27, 2008

(86) PCT No.: PCT/JP2008/071519
§ 371 (c)(1),
(2), (4) Date: Jan. 4, 2011

(87) PCT Pub. No.: WO2009/130817
PCT Pub. Date: Oct. 29, 2009

(65) Prior Publication Data
US 2011/0091212 A1    Apr. 21, 2011

(30) Foreign Application Priority Data

Apr. 25, 2008  (JP) .................. 2008-114767

(51) Int. Cl.
*H04J 14/08* (2006.01)
*H04J 14/00* (2006.01)

(52) U.S. Cl.
USPC ............................... 370/424; 398/54

(58) Field of Classification Search
None
See application file for complete search history.

(56) References Cited

U.S. PATENT DOCUMENTS

| 5,604,867 | A | * | 2/1997 | Harwood | 709/233 |
|---|---|---|---|---|---|
| 5,655,140 | A | * | 8/1997 | Haddock | 709/246 |
| 6,680,942 | B2 | * | 1/2004 | Mead et al. | 370/392 |
| 7,680,031 | B1 | * | 3/2010 | Luft et al. | 370/222 |
| 2001/0012296 | A1 | * | 8/2001 | Burgess et al. | 370/392 |
| 2002/0176450 | A1 | | 11/2002 | Kong et al. | |
| 2003/0067912 | A1 | * | 4/2003 | Mead et al. | 370/389 |
| 2003/0152182 | A1 | | 8/2003 | Pai et al. | |
| 2004/0062257 | A1 | * | 4/2004 | Nguyen | 370/403 |
| 2004/0076175 | A1 | | 4/2004 | Patenaude | |
| 2004/0146058 | A1 | | 7/2004 | Nemoto et al. | |
| 2004/0190524 | A1 | * | 9/2004 | Golla et al. | 370/395.4 |
| 2004/0208554 | A1 | * | 10/2004 | Wakai et al. | 398/54 |
| 2005/0180752 | A1 | | 8/2005 | Nakagawa | |
| 2006/0083253 | A1 | | 4/2006 | Park et al. | |
| 2006/0221960 | A1 | * | 10/2006 | Borgione | 370/390 |

(Continued)

FOREIGN PATENT DOCUMENTS

EP     1 414 265 A2    4/2004
JP     09-224046       8/1997

(Continued)

OTHER PUBLICATIONS

PCT International Search Report on International Application No. PCT/JP2008/071519 mailed Dec. 22, 2008; 1 page.

(Continued)

*Primary Examiner* — Bunjob Jaroenchonwanit

(74) *Attorney, Agent, or Firm* — Foley & Lardner LLP

(57) ABSTRACT

An optical multi-drop path is set to a downstream direction, an optical path between adjacent nodes is set to a upstream direction, a packet sorting unit is provided for appropriately controlling packet streams in the downstream direction and upstream direction, and one-to-one or one-to-N communication can be performed not only between servers and clients but also between the clients even when a multi-drop transmission is used in the downstream direction.

4 Claims, 17 Drawing Sheets

(56) References Cited

U.S. PATENT DOCUMENTS

2008/0260382 A1* 10/2008 Okazaki .................... 398/45
2010/0098000 A1* 4/2010 Gerszberg et al. ........... 370/328
2010/0329247 A1* 12/2010 Kennedy et al. ............. 370/389

FOREIGN PATENT DOCUMENTS

| JP | 2001-168842 | 6/2001 |
| JP | 2003-259471 | 9/2003 |
| JP | 2004-349999 | 12/2004 |
| JP | 2005-236402 | 9/2005 |

OTHER PUBLICATIONS

European Patent Office; extended Search Report on application No. 08 87 4020 dated Apr. 11, 2012; 6 pages.
European Patent Office; extended Search Report on application No. 08 87 4020 dated Apr. 4, 2012; 6 pages.

* cited by examiner

I/G = 0 INDIVIDUAL ADDRESS
I/G = 1 GROUP ADDRESS
U/L = 0 GLOBALLY ADMINISTERED ADDRESS
U/L = 1 LOCALLY ADMINISTERED ADDRESS

PACKET TRANSFER DEVICE

INCORPORATION BY REFERENCE

The present application claims priority of Japanese Patent Application No. 2008-114767 filed Apr. 25, 2008, the disclosure of which is incorporated herein by reference.

TECHNICAL FIELD

The present invention relates to an optical transmission system and an optical network for use in a trunk line network for covering between countries and a regional line network for covering all regions of a country, etc, and in particularly to an optical transmission system capable of receiving an optical signal transmitted from an arbitrary node by a plurality of nodes, and a packet transfer device for use in the system.

BACKGROUND ART

In a rapid increase of data traffic recently typified by Internet, a transmission capacity in communication networks has advanced in great capacity. This great capacity has been realized by converting a transmission signal to be an electric signal to an optical signal with use of a time-division multiplex technique and a light wavelength multiplex technique. A transmission device responded to ten gigabits per second for one channel has been turned into practical use, and a wavelength multiplexing transmission device of a point-to-point type capable of transmitting in a long distance over several hundreds kilometers by using an optical amplifier, a regenerative repeater, etc., has also been turned into practical use by multiplexing several to several tens of channels per one fiber in wavelength to one optical fiber.

For a purpose of responding to a demand increase of the transmission capacity, a more economically purposed request, and a diversity of services in the future, a ring optical network in which communication nodes are connected in a ring shape, has been studied. In the optical transmission system for use in the ring optical network, a device so called an optical add-drop multiplexer (hereinafter, referred to as OADM) is used. In such optical network, an operation of network monitoring control system, which unifies to remotely manage the node devices, is made simplified, and a monitor control unit in each of the node devices is mutually communicated with each other. In consequence, an easiness of path management from a start to an end of the line so-called end-to-end has been realized, and a speeding-up for a path setting has also been realized. Further, by using an advanced optical transmission technique, it has been considered that an entire network can be realized economically by configuring that the optical signal, without performing an electric-optic conversion, passes through the node. It is normal that a one-to-one bidirectional communication is performed in the optical transmission system for use in the optical network.

In contrast, a video delivery has been discussed as an aspect of the above-mentioned diversity of services. In the video delivery, there is a possibility to realize the video delivery from an economical standpoint, compared with a method of transmitting the electric signal with use of a router, by receiving the optical signal transmitted from an arbitrary node at the plurality of nodes. In an IP (Internet Protocol) transmission method used in the router, the bidirectional communication is performed between a transmission source and a receiving destination of data, for a purpose of controlling that whether a node performs a multicast reception, when performing a one-to-N communication (multicast communication). In accordance with this, it is required to realize the one-to-N bidirectional communication even when replacing the multicast network using the router with the optical ring network.

JP-A-2005-236402 (patent document 1) discloses an example where the one-to-N communication is performed by using the optical signal, which is not an existing one-to-one communication. In the patent document 1, a downstream direction uses a drop and continue function, and an upstream direction uses the time-sharing communication system. In this way, the bidirectional communication between the transmission source node and receiving destination node is realized for the multicast data.

DISCLOSURE OF THE INVENTION

Problems to be Solved by the Invention

There is no problem if a server can communicate with clients individually when performing the video delivery. However, in a P2P (Point To Point) communication technique etc. widely used in recent years, it is required to communicate between not only a specific server and the clients but also arbitrary clients. In the technique disclosed in the above-mentioned patent document 1, there is a problem such that the upstream direction becomes the one-to-one communication between a server node and a client node, but the communication cannot be performed between the client nodes.

Means for Solving the Problems

In order to solve the above-mentioned problem, a packet transfer device is provided such that it is connected between an optical node for branching and inserting an optical signal and a packet node for transmitting and receiving data per packet units. This packet-provided device configures such that it includes a first interface for transmitting and receiving a packet between the optical nodes, a second interface for transmitting and receiving the packet between the packet nodes, and a transfer control unit for transferring the received packet to the first interface when receiving the packet from the second interface.

Advantages of the Invention

According to the packet transfer device in the invention, not only the one-to-N communication can be performed between the server node to be a transmission source of multicast data and a plurality of client nodes for receiving the multicast data, but also the one-to-one or one-to-N communication can be realized between the client node and other client nodes and between the client node and the server node. Further, since the bidirectional one-to-N communication is performed with use of one wavelength when using the wavelength multiplex system for the optical transmission, a wavelength-used efficiency can be improved.

Other objects, aspects and advantages of the invention will be made apparent from embodiments of the invention disclosed with reference to the accompanying drawings.

BEST MODE FOR CARRYING OUT THE INVENTION

Hereinafter, embodiments of the invention will be described with reference to the drawings.

Embodiment 1

FIG. 1 shows a configuration in one embodiment of a video delivery system using the present invention. The video delivery system in this embodiment includes a delivery server 110, a core network 120, an access network 130, a subscriber network 140, and clients 150.

Video data is stored in the delivery server 110 and delivered to the client 150 via the core network 120, access network 130 and subscriber network 140. The network for delivering the video data is configured hierarchically, and a portion of coupling the clients with a building of carrier is the subscriber network 140, a network of every region is the access network 130, and a whole country network coupled with the access networks is the core network 120.

The core network 120 is a network coupled between packet nodes 70 by a long distance fiber 121. The access network 130 is configured by an optical node 20, a packet sorting unit 80, the packet node 70, and a transmission path fiber 60. The access network 130 is described in FIG. 2 in detail. The subscriber network 140 is a network employing a PON (Passive Optical Network) technique and configured by an OLT (Optical Line Terminal) 141, a subscriber fiber 142, and an ONU (Optical Network Unit) 143.

The core network 120 is configured by relatively small number (for example, about ten units) of packet nodes 70. The core network 120 is literally an essential network of the carrier, therefore, it employs high speed and high price devices. This is normally designed with a sufficiently allowable performance. In contrast, the subscriber network 140 easily realizes a one-to-multitude multicast delivery by the PON technique since signals on a single subscriber fiber 142 are branched and delivered to a number of the ONUs 143.

It is required to install a number of access networks 130, therefore, it is crucial to use devices effectively. In this embodiment, a less number of wavelengths are used to be able to realize a bidirectional multicast in a wavelength multiplexing ring network of the access network 130. In addition, FIG. 1 is absolutely used for explaining an example in the embodiment of the invention, therefore, the core network 120 and subscriber network 140 may be configured by other configuration other than FIG. 1.

FIG. 2 shows a system configuration in one embodiment of the invention. This system is configured by the optical node 20, the packet sorting unit 80, the packet node 70, and a management device 90. The respective optical nodes 20 are connected in a ring shape by two transmission path fibers 60. In this drawing, the number of optical node 20 is three, and one unit of the packet node 80 is connected with each of the optical nodes 20. Even though a configuration in which the number of optical node is other than three and more than one packet node are connected respectively with the optical nodes, it is needless to say that the present invention can be implemented.

The packet node 70 is a device for performing the multicast of packet, or a device generally called a router or switch. In implementation of the invention, the packet node 70 may provide a standardized multicast function, that is, does not provide an intrinsic means for the present invention. Therefore, a detailed description for that is omitted.

The management device 90 is generally referred to as EMS (Element Management System) and is a device for setting a data path from one node to the other by performing a configuration management of the nodes in the network and a setting in the plural nodes.

FIG. 3 shows a configuration example of the optical node 20. The optical node 20 in this embodiment is configured by a node monitoring control unit 25, a WDM optical switching unit 40, an optical amplifier unit 50, and an optical transponder 30.

The node monitoring control unit 25 has a CPU, a memory and a communication control unit to control the optical nodes 20 as a whole and monitor their condition. The WDM optical switching unit 40 selects an output destination path of the signal from the optical transponder 30 and performs the wavelength multiplexing. The optical amplifier unit 50 has a function such that either it amplifies a signal from the WDM optical switching unit to send to the transmission path fiber 60 or it amplifies a wavelength multiplexing signal from the transmission path fiber 60 to send to the WDM optical switching unit 40.

The optical node 20 in this embodiment has a two-way path for the transmission path due to a ring configuration. For a purpose of explanation, the two-way path calls an EAST bound path for one and a WEST bound path for the other. The EAST bound path of one optical node is connected with the WEST bound path of the other optical node, which forms a ring shape path as a whole.

It is considered that the configuration of WDM optical switching unit 40 includes several cases, however, this embodiment uses a configuration of a wavelength selectable switch (WSS) 45. The wavelength selectable switch is a switch not only having a path changing-over function of the optical signal, but also having a wavelength multiplexing function. The WSS outputs an identical wavelength signal to two output ports, that is, can realize a drop and continue function or a bridge function. The WSS has been disclosed, for example, in the following document [S. Frisken, H. Zhou, D. Abakoumov, G. Baxter, S. Poole, "High performance 'Drop and Continue' functionality in a Wavelength Selective Switch", OFCNFOEC2006 post deadline PDP14.].

As shown in FIG. 3, the WDM optical switching unit 40 is configured by four wavelength selectable switches 45: an ADD-WEST portion wavelength selectable switch 45-1; a DROP-WEST portion wavelength selectable switch 45-2; a DROP-EAST portion wavelength selectable switch 45-3; and an ADD-EAST portion wavelength selectable switch 45-4. The wavelength selectable switch 45 includes two types: the ADD-WEST 45-1 and the ADD-EAST 45-4 providing an ADD function; and the DROP-WEST 45-2 and the DROP-EAST 45-4 providing a DROP function. The wavelength selectable switch 45 providing the DROP function can perform at least three types of process for an arbitrary wavelength optical signal contained in the wavelength multiplexing optical signal received from the transmission path fiber: (1) to perform "drop" toward the transponder 30; (2) to perform "through" toward the wavelength selectable switch 45 providing the ADD function; and (3) to perform "drop" toward the transponder 30 and "through" toward the wavelength selectable switch 45 providing the ADD function. The wavelength selectable switch 45 providing the ADD function multiplexes the arbitrary wavelength optical signal received from the transponder 30 with the wavelength multiplexing optical signal from the wavelength selectable switch 45 providing the DROP function to output toward the transmission path fiber. The wavelength selectable switch 45 can also perform "drop" (branch) or "add" (multiplex) for plural wavelength optical signals individually. In this case, the plural transponders 30 are connected to one wavelength selectable switch 45. For example, the node monitoring control unit 25 received an instruction from the management device 90 may set which of the wavelength optical signals are performed of "drop", "through" or "add".

The optical transmission signal entered from the WEST bound path is amplified by an optical amplifier unit 50-1, thereafter, entered into the DROP-ESET 45-2, and a selected specific wavelength is sent to an optical transponder unit 30-1. The optical transmission signal is then entered into the ADD-EAST 45-4 to be synthesized with the specific wavelength signal sent from an optical transponder unit 30-2, amplified by an optical amplifier unit 50-2 and sent to the EAST bound path.

The optical transmission signal entered from the EAST bound path is likewise amplified by the optical amplifier unit 50-2, thereafter, the specific wavelength in the DROP-EAST 45-3 is sent to the optical transponder unit 30-2 to be synthesized with a signal from the optical transponder unit 30-1 in the ADD-WEST 45-1, amplified by the optical amplifier unit 50-1 and sent to the WEST bound path.

This embodiment uses Ethernet (registered trademark) as a packet transfer technique. The Ethernet is a network technique specified by IEE802.3-2002 edition established by IEEE (The Institute of Electrical and Electronics Engineers, Inc.) and its subsequent specification. FIG. 4 is a diagram showing a packet data format in Ethernet. In addition, an integrated signal to be exchanged in Ethernet is referred to as a frame, but a generally integrated data to be transferred on the network is referred to as a packet in this embodiment. This embodiment will be described with the case of using Ethernet. However, this embodiment is applicable to a protocol for transferring data appended with an address indicating a destination of integrated data to be transferred as signal, not only applying to Ethernet but also to other protocol of TCP/IP, UDP/IP, etc.

As shown in FIG. 4, a destination address (DESTINATION ADDRESS) and a source address (SOURCE ADDRESS) are stored in a header portion of the packet in Ethernet. Generally, these addresses are used as a MAC (Media Access Control) address of a communication terminal. The packet sorting unit 80 in this embodiment sends data to a node coincident with the destination address contained in the packet in the Ethernet.

FIG. 5 is a diagram showing an address format of Ethernet. As show in FIG. 5, Ethernet discriminates whether the packet is a packet (unicast packet) sent to one node or a packet (multicast packet) sent addressing to plural nodes in response to a value of I/G bit in the address. In addition, the packet to be sent addressing to all of the nodes, among multicast packets, is referred to as a broadcast packet.

FIG. 6 is a configuration diagram of the packet sorting unit 80. The packet sorting unit 80 is configured by a packet transfer control unit 81, an address storing unit 82, and a plurality of packet IFs 85 (85X, 85Y, 85Z). The packet IF 85 performs an input and output of the packet between the optical nodes 20 or between the packet nodes 70. The address storing unit 82 stores address information referred by the packet transfer control unit 81 when it determines a transfer destination of the packet. The packet sorting unit 80 determines destination address information of the packet entered into the packet IF 85, an input IF class indicating that the packet is entered from which of the IFs are activated among the plural packets IF 85, and the packet IF 85 for transferring the packet by using contents in the address storing unit 82. The input IF class may be used any information if it is information uniquely distinguishable for the respective interfaces (IF) 85 in the packet sorting unit 80.

The function of packet sorting unit 80 is likewise to a function of devices referred generally to as a layer 2 switch, but an algorism when transferring the packet is different from the generally used layer 2 switch (Ethernet bridge specified by IEEE802.1D).

In addition, the packet sorting unit 80 in this embodiment has two types: a route packet sorting unit 80A; and leaf packet sorting units 80B, 80C, in accordance with the difference of packet transfer algorism. The packet transfer algorism packaging method includes a method of realizing by a control software in the packet transfer control unit and a method of using a reconfigurable hardware, such as FPGA (Field Programmable Gate Array) for the packet transfer unit, to configure a circuitry corresponding to the algorism and realize it.

FIG. 7 shows a connecting relation between the route packet sorting unit 80A and an optical node A 20A. The route packet sorting unit 80A has three packet IFs 85X, 85Y and 85Z, but, in the route packet sorting unit 80A, the packet IF 85X is connected with the optical transponder 30-1 in the optical node A 20A (port X). Further, the packet IF 85Z in the route packet sorting unit 80A is connected with a route packet node 70A (port Z), and the packet IF 85Y is unused (port Y). In addition, in this embodiment, all of the packet sorting units 80 have a common configuration. An unused port is appeared in the route packet sorting unit so that the use of route packet sorting unit/leaf packet sorting unit is changed in accordance with a setting alteration depending on availability. The unused port Y is not required when a role of the packet sorting unit is set in advance to configure an exclusively used route packet sorting unit. Further, the address storing unit 81 in the route packet sorting unit stores an address for discriminating the route packet node 70A when determining a packet path.

An operation detail of the packet sorting unit 81 in the route packet sorting unit 80A is shown in a flowchart of FIG. 9. First, the packet transfer control unit 81 confirms whether an input from the packet IF 85X is present (8101). If the input is present, the packet transfer control unit 81 checks whether the destination address of the input packet is the unicast address (8102), by detecting the value of I/G bit shown in FIG. 5 etc. If the address is other than the unicast address (multicast or broadcast), the packet transfer control unit 81 copies the input packet to output to both the packet IF 85X and packet IF 85Z (8104). By the output to the packet IF 85X, the packet can be transferred to the leaf packet node 70 via the optical node 20A, and by the output to the packet IF 85Z, the route packet node 70A itself can receive the packet.

If the destination is the unicast address at the step 8102, the packet transfer control unit 81 compares the value of destination address of the input packet with the value in the address storing unit 82 (8103). If the compared addresses are coincident, the packet transfer control unit 81 makes the input packet output from the packet IF 85Z since the destination of the unicast packet is the route packet node 70A (8105). If the compared addresses are not coincident, the packet transfer control unit 81 makes the input packet output to the packet IF 85X (8106). This is because the packet is sent, turned back, to the transmission path fiber 60 to deliver the packet to a downstream node on a multicast path.

Next, the packet transfer control unit 81 confirms whether the input is present from the packet IF 85Z (8107). If the input is not present, the process returns to the step 8101. If the input is present, the packet transfer control unit 81 makes the input packet output to the packet IF 85X (8108). Thereafter, the process returns to the step 8101 to continue the process.

In addition, it is considered that the method of storing the address of the route packet node 70A in the address storing unit 81 includes several methods, such as a method of setting from the management device 90 and a method of setting by the packet transfer control unit 81 itself with reference to the transmission source address of the packet entered from the packet IF 85Z.

FIG. 8 shows an operation outline of the leaf packet sorting unit 80B. The packet sorting unit 80 has three packet IFs 85X, 85Y and 85Z. In the leaf packet sorting unit 80B, the packet IF 85X is connected with the downstream direction optical transponder 30-2 in an optical node B 20B (port X), the packet IF 85Y is connected with the upstream direction optical transponder 30-1 in the optical node B 20B (port Y), and the packet IF 85Z is connected with a leaf packet node 70B (port Z). Here, the downstream direction optical transponder 30-2 is an optical transponder which receives a signal of the downstream direction (a direction toward which data is sent on an optical multi-drop path) from the transmission path fiber 60 to transmit the signal to the upstream direction (a direction toward which data is sent on an one-to-one ordinary optical path) via a transmission path fiber 61. Further, the upstream direction optical transponder 30-1 is an optical transponder which receives an upstream direction signal from the transmission path fiber 61. The upstream direction optical transponder 30-1 in the optical node B 20B does not require to have the function for transmitting the signal to the optical transmission path.

In addition, the DROP-EAST 45-3 as WSS in the optical node B 20B is set such that the optical signal of the wavelength used in the multicast communication is performed of "drop" to the downstream direction transponder 30-2 and of "through" toward the ADD-WEST 45-1.

The address storing unit 82 in the leaf packet sorting unit 20B stores an address of the leaf packet node 70B. It is considered that the method of storing the address of the leaf packet node 70B in the address storing unit 82 includes, likewise to the case in the route packet sorting unit 20A, a method of setting from the management device 90 and a method of setting by the packet transfer control unit 81 itself with reference to the transmission source address of the packet to be entered from the packet IF 85Z.

An operation detail of the packet transfer control unit 81 in the leaf packet sorting unit 20B is shown in a flowchart of FIG. 10. First, the packet transfer control unit 81 checks whether an input is present from the packet IF 85X (8201). If the input is present, the packet transfer control unit 81 outputs the input packet to the packet IF 85Z (8202) to also transfer the input packet to the leaf packet node 70B.

Next, the packet transfer control unit 81 checks whether the input is present from the packet IF 85Y (8203). The input from the packet IF 85Y means a packet received from the downstream leaf packet node. If the input is present, the packet transfer control unit 81 checks whether the destination address of input packet is the unicast address, by detecting the value of I/G bit etc., for example (8204). If the checked address is an address other than the unicast address, the packet transfer control unit 81 outputs the input packet to the packet IF 85X (8205) to transfer the packet to the upstream packet sorting unit 80 via the upstream direction transponder 30-2 and transmission path fiber 61.

If the checked address is the unicast, the packet transfer control unit 81 compares the value of destination address of the input packet with the value of address of leaf packet node 70B stored in the address storing unit 82 (8206) to then determine whether the unicast packet is to be addressed to the leaf packet node 70B. If the compared addresses are coincident, the packet transfer control unit 81 sends out the input packet to the leaf packet node 70B via the packet IF 85Z (8207). If the compared addresses are not coincident, the packet transfer control unit 81 outputs the input packet to the packet IF 85X (8208) to further transfer to the node of the upstream.

Finally, the packet transfer control unit 81 checks whether the input from the packet IF 85Z or the packet from the leaf packet node 70B is present (8209). If the input is present, the input packet is output to the packet IF 85X (8210) to transfer the packet to the upstream node. If the input is not present, the process returns to the step 8201 to continue the process.

In addition, a leaf packet sorting unit 80C operates likewise to the leaf packet sorting unit 80B, however, a low-order node does not exist from itself since the leaf packet sorting unit 80C is positioned at a termination point of the multicast packet path. Therefore, the IF 85Y is not used in this embodiment.

Hereinafter, a specific example of the packet transfer process in this embodiment will be described with reference to FIG. 2, FIG. 7 and FIG. 8. An operation of the packet node 70, packet sorting unit 80 and optical node 20 will be described for the following four paths.

(1) An optical multi-drop path in which the optical transponder 30-1 in the optical node 20A is set to a transmission side, and the optical transponder 30-2 in the optical node 20B and the optical transponder 30-2 in the optical node 20C are set to a reception side.

(2) An ordinary optical path (hereinafter, described as first ordinary optical path) in which the optical transponder 30-2 in an optical node C is set to the transmission side, and the optical transponder 30-1 in an optical node B is set to the reception side.

(3) An ordinary optical path (hereinafter, described as second ordinary optical path) in which the optical transponder 30-2 in the optical node B is set to the transmission side, and the optical transponder 30-1 in the optical node A is set to the reception side.

The above-mentioned three optical paths are set. In addition, the setting method of optical path has the case where the setting is performed by a central control from one unit of the management device, and a method of setting dispersedly between the optical nodes by employing GMPLS (GENERARIZED MULTI-PROTOCOL LABEL SWITCHING) and using a signaling protocol, etc. The present invention is applicable to either setting method even though it employs. In this embodiment, the setting is performed by the central control using the management device 90.

Further, an MAC address of the route packet node 70A is set to an MAC address A. An MAC address of the leaf packet node 70B is set to an MAC address B. An MAC address of a leaf packet node C is set to an MAC address C. The destination address of packet to be performed of the multicast transmission from the route packet node 70A to the other packet node is set to an MAC address M. The destination address of packet to be performed of the multicast transmission to the other packet node by the leaf packet node C is set to an MAC address N. Each of the MAC addresses A to C is an address, the I/G bit of which is "0" in FIG. 5. Each of the MAC addresses M to N is an address, the I/G bit of which is "1" in FIG. 5.

Since the MAC address of the respective packet nodes is as mentioned above, the address storing unit 82 in the packet sorting unit 80A stores the MAC address A. The address storing unit 82 in the packet sorting unit 80B stores the MAC address B, and the address storing unit 82 in the packet sorting unit 80C stores the MAC address C.

At the beginning, a description will be concerned with the case where the unicast packet is transmitted from the route packet node 70A to the leaf packet node C by using the optical multi-drop path.

When the packet, the transmission source address of which is the MAC address A and the destination address of which is the MAC address C, is transmitted from the route packet node 70A, this packet first enters the packet IF 85Z in the route packet sorting unit 80A. The entered packet is output from the packet IF 85X in accordance with a determined result at the step 8107 in FIG. 9 to be entered into the optical transponder 30-1 in the optical node 20A.

The optical transponder 30-1 converts the packet data into an optical signal of wavelength λ1 from the electric signal to transmit the optical signal to the transmission path fiber 60 via the ADD-WEST 45-1 in the optical switch unit 40. The optical signal is delivered to the optical node B 20B via the transmission path fiber 60 to send to both the optical transponder 30-2 and the transmission path fiber 60 in the optical node B 20B by the DROP-EAST 45-3 in the optical switching unit 40. Here, the DROP-EAST 45-3 in the optical node B 20B is set to performing both "drop" and "through" for the optical signal of wavelength λ1.

The optical transponder 30-2 in the optical node B 20B converts the received optical signal into packet data to send to the packet IF 85X in the leaf packet sorting unit 80B. The leaf packet sorting unit 80B makes the received packet output from the packet IF 85Z in accordance with the determined result at the step 8201 in FIG. 10. The packet sent from the packet IF 85Z in the leaf packet sorting unit 80B is delivered to the leaf packet node 70B, and the leaf packet node 70B compares the MAC address C to be the packet destination address with the MAC address B itself. At this time, the MAC addresses are not coincident with each other, therefore, the packet is discarded in the leaf packet node 70B.

In contrast, the optical signal performed "through" by the DROP-EAST 45-3 in the optical node B 20B is delivered to an optical node C 20C via the transmission path fiber 60. Since the DROP-EAST 45-3 in the optical node C 20C is set so as to perform "drop" alone for the optical signal of wavelength λ1, it makes the optical signal branch toward the optical transponder 30-2, but does not perform "through". The optical transponder 30-2 in the optical node C 20C converts the received optical signal into the electric signal to transmit the packet toward the IF 85X in the leaf packet sorting unit 80C. The packet transfer control unit 81 in the leaf packet sorting unit 80C outputs the packet received from the IF 85X from the IF 85Z in accordance with the step 8201 in FIG. 10. A leaf packet node C 70C recognizes that the received packet is a packet to be addressed to the own node to perform a process corresponding to packet contents, since the destination address of the received packet from the IF 85Z is coincident with the own MAC address Next, a description will be concerned with the case where the multicast packet is transmitted to the leaf packet nodes 70B, 70C by the route packet node 70A with use of the optical multi-drop path. When the packet, the transmission source address of which is the MAC address A and the destination address of which is the MAC address M to be the multicast address, is transmitted from the route packet node 70A, the optical transponder 30-1 in the optical node A 20A converts the packet into the electric signal of wavelength λ1. Likewise to the above mentioned process, the packet converted into the optical signal is sent to all of the leaf packet nodes in the leaf packet node B 70B and leaf packet node C 70C. The respective leaf packet nodes perform the corresponding process in an own node if the own node belongs to the MAC address M, and the packet is discarded if the own node does not belong to the MAC address M.

The multicast address of the MAC address has a correspondence relation with that of an IP address, and the multicast address of MAC is uniquely determined from the multicast address of IP. Therefore, a judgment in which whether the own node belongs to a multicast group by the leaf packet nodes 70B, 70C may be performed by using IGMP (Internet Group Management Protocol), MID (Multicast Listener Discovery), DVMRP (Distance Vector Multicast Routing Protocol), PIM (Protocol Independent Multicast), etc.

Next, a description will be concerned with the case where the leaf packet node 70C of the downstream transmits the unicast packet toward the route packet node 70A of the upstream by using the first ordinary optical path and second ordinary optical path.

When the packet, the transmission source address of which is the MAC address C and the destination address of which is the MAC address A, is transmitted from the leaf packet node 70C, this packet first enters the packet IF 85Z in the leaf packet sorting unit 80C. The entered packet is output from the packet IF 85X in accordance with the determined result at the step 8209 in FIG. 10 to enter the optical transponder 30-2 in the optical node 20C. The transponder 30-2 converts the packet data received from the IF 85X into the optical signal of wavelength λ1 to output to the DROP-EAST 45-3. Since the DROP-EAST 45-3 is set so as to multiplex the optical signal of wavelength λ1, it multiplexes the optical signal of the wavelength λ1 from the transponder 30-2 with the optical signal from the ADD-WEST 45-1 to transmit to the optical node B 20B via the optical transmission fiber 61. At this time, the first ordinary optical path is used.

The optical signal from the optical node C 20C is delivered to the optical node B 20B. Since the DROP-WEST 45-2 in the optical node B 20B is set such that the optical signal of wavelength λ1 is performed of "drop" without performing "through", this optical signal is branched and output to the transponder 30-1. The optical transponder 30-1 again converts the received optical signal into the packet data to transmit the converted packet data to the leaf packet sorting unit 80B via the IF 85Y.

Next, the leaf packet sorting unit 80B performs the determination at the step 8206 in FIG. 10. The leaf packet sorting unit 80B determines that the MAC address A to be the destination address of the packet is different from the MAC address B, in the leaf packet node 70B, stored in the address storing unit 82 in the leaf packet sorting unit 70B to then proceed to the step 8208 and output the packet from the packet IF 85X. The optical transponder 30-2 in the optical node 20B converts the packet from the IF 85X into the optical signal of wavelength λ1 to transmit to the ADD-EAST 45-4. Since the ADD-EAST 45-4 is set such that the optical signal of wavelength λ1 is performed of "add", it multiplexes the received optical signal with the optical signal from the DROP-WEST 45-2 to output to the transmission path fiber 61. At this time, the second ordinary optical path is used.

The DROP-WEST 45-2 in the optical node A 20A branches the received optical signal to transmit to the transponder 30-1 since it is set such that the optical signal of wavelength λ1 is not performed of "through" but performed of "drop". The transponder 30-1 converts the optical signal into the electric signal to be set to the packet data to be output to the IF 85X in the route packet sorting unit 80A. The packet transfer control unit 81 in the route packet sorting unit 80A performs the determination at the step 8103 in FIG. 9. The packet transfer control unit 81 determines that the MAC address A to be destination address of the packet is coincident with the MAC address A in the route packet node 70A. The process proceeds to the step 8105 in FIG. 9, and the packet is output from the packet IF 85Z to transmit to the route packet node 70A. The route packet node A recognizes that the packet is a packet to be addressed to the own node, since the destination address of the packet is coincident with the own MAC address, to then perform the process corresponding to packet contents.

Next, a description will be concerned with the case where the leaf packet node 70B transmits the unicast packet toward the leaf packet node 70C by using the second ordinary optical path and optical multi-drop path.

When the packet, the transmission source address of which is the MAC address B and the destination address of which is the MAC address C, is transmitted from the leaf packet node 70B, this packet first enters the packet IF 85Z in the leaf packet sorting unit 80B. The entered packet is output from the packet IF 85X in accordance with the determined result at the step 8209 in FIG. 10 to enter the optical transponder 30-2 in the optical node B 20B. The transponder 30-2 converts the packet data as electric signal into the optical signal of wavelength λ1 to send to the transmission path fiber 61 via the ADD-EAST 45-4. At this time, the second ordinary optical path is used.

In fact, the optical signal is not sent directly toward the optical node C 20C, but toward the optical node A 20A once. The optical node 20A supplies the optical signal of wavelength λ1 to the optical transponder 30-1 via the DROP-WEST 45-2, and the optical transponder 30 converts again the optical signal into the packet data to send out to the packet IF 85X in the route packet sorting unit 80A. The route packet sorting unit 80A performs the determination at the step 8103 in FIG. 9. The packet transfer control unit 81 determines that the MAC address C to be the destination address of the packet receive from the IF 85X is different from the MAC address A of the route packet node 70A stored in the address storing unit 82 to again output the packet from the packet IF 85X.

The packet output from the route packet sorting unit 80A is converted into the optical signal of wavelength λ1 by the transponder 30-1 in the optical node A 20A to be output to the transmission path fiber 60 via the ADD-WEST 45-1. At this time, the optical multi-drop path is used.

The DROP-EAST 45-3 in the optical node B 20B branches the optical signal of wavelength λ1 from the optical node A 20A to the transponder 30-2 and also transmits the optical signal, without change, toward the ADD-WEST 45-1. The transponder 30-2 in the optical node B 20B converts the optical signal from DROP-EAST 45-3 into the electric signal to output to the IF 85X in the leaf packet sorting unit 80B. The leaf packet sorting unit 80B outputs the packet entered from the IF 85X to the IF 85Z in accordance with the step 8201 in FIG. 10. The packet sent from the packet IF 85Z in the leaf packet sorting unit 80B is delivered to the leaf packet node 70B, however, since the destination address of this packet is the MAC address C different from the MAC address B of the leaf packet node 70B, the packet is discarded in the leaf packet node 70B.

In contrast, the optical signal of wavelength λ1 performed "through" by the DROP-EAST 45-3 is delivered to the optical node C 20C via the transmission path fiber 60. At this time, the optical multi-drop path is also used. As mentioned above, the DROP-EAST 45-3 in the optical node C 20C is set such that it only branches the received optical signal of wavelength λ1 but does not perform "through", and it outputs the optical signal to the transponder 30-2 in the optical node B 20B. The transponder 30-2 converts the entered optical signal into the electric signal to output to the IF 85X in the leaf packet sorting unit 80C. The packet transfer control unit 81 in the leaf packet sorting unit 80C outputs the entered packet from the IF 85X to the IF 85Z in accordance with the determination at the step 8201 in FIG. 10. The leaf packet node 70 recognizes that this packet is a packet to be addressed to the own node since the destination address C of the packet received via the IF 85Z is coincident with the own MAC address C, and the process corresponding to the packet contents is then performed.

In this way, when the unicast packet is transmitted between the leaf packet nodes, the path of packet is different depending on whether the node for transmitting the packet is present in the upstream or the downstream of the optical multi-drop path rather than the node which receives. In fact, the unicast packet transmitted from the leaf packet node 70C is transmitted to the upstream direction on the path of multicast packet, by the first and second ordinary optical paths via the transmission path fiber 61. If the node to be the destination is present while the packet is transferred in the upstream direction, the packet is received at this time to then terminate the transfer process. However, when the node sent out the unicast packet is positioned at the upstream of the multicast packet path rather than the node to be the destination of the packet, the unicast packet is delivered up to the route packet node once by the ordinary optical path and turns back at that node to be delivered to the node to be the destination via the optical multi-drop path.

Finally, a description will be concerned with the case where the leaf packet node 70C transmits the multicast packet by using the first ordinary optical path, second ordinary optical path and the optical multi-drop path.

When the packet, the transmission source address of which is the MAC address C and the destination address of which is the multicast address to be the MAC address N, is transmitted from the leaf packet node 70C, this packet first enters the packet IF 85Z in the leaf packet sorting unit 80C. The entered packet is output from the packet IF 85X in accordance with the determined result at the step 8209 in FIG. 10 to enter the optical transponder 30-2 in the optical node C 20C. The packet data is converted into the optical signal of wavelength λ1 by the optical transponder 30-2 to send to the optical transponder 30-1 in the optical node 20B via the ADD-EAST 45-4 in the optical node 20C, transmission path fiber 60, DROP-WEST 45-2 in the optical node 20B.

The transponder 30-1 in the optical node B 20B again converts the received optical signal into the packet data as electric signal to send out to the packet IF 85Y in the leaf packet sorting unit 80B. The packet transfer control unit 81 in the leaf packet sorting unit 70B determines that the determined result is NO at the determination of the step 8204 in FIG. 10 to then make the process proceed to the step 8205 and output the packet from the packet IF 85X, since the MAC address N to be the destination address of the packet is the multicast address. The transponder 30-2 in the optical node B 20B converts the packet data from the packet IF 85X into the optical signal of wavelength λ1. This converted optical signal is sent to the optical transponder 30-1 in the optical node 20A via the ADD-EAST 45-4, transmission path fiber 61, and DROP-WEST 45-2 in the optical node A 20A to be converted again into the packet data and sent to the packet IF 85X in the route packet sorting unit 80A.

In the route packet sorting unit 80A, the determined result at the determination of the step 8102 in FIG. 9 is NO since the MAC address N to be the destination address of the packet is the multicast address. The process then proceeds to the step 8104 to output the packet from the packet IFs 85X and 85Z. The packet data output from the packet IF 85Z is sent to the route packet node 70A, and the packet data output from the packet IF 85X is sent back again to the optical transponder 30-1 in the optical node 20A. The packet data is converted into the optical signal of wavelength λ1 by the optical transponder 30-1 to send to the ADD-WEST 45-1 in the optical node A 20A, transmission path fiber 60 and DROP-EAST 45-3 in the optical node B 20B. The DROP-EAST 45-3 in the optical node B 20B branches this optical signal toward the optical transponder 30-2 and also performs "through" toward the transmission path fiber 60 without change. The optical node 20C sends the optical signal received from the transmission path fiber 60 to the optical transponder 30-2 via the DROP-EAST 45-3.

A description will be concerned with the optical signal branched in the DROP-EAST 45-3 in the optical node B 20B. The optical transponder 30-2 in the optical node 20B converts the received optical signal into the packet data to send to the packet IF 85X in the leaf packet sorting unit 80B. The leaf packet sorting unit 80B makes the received packet output from the packet IF 85Z in accordance with the determined result at the step 8201 in FIG. 10. The packet sent from the packet IF 85Z in the leaf packet sorting unit 80B is delivered to the leaf packet node 70B.

Next, a description will be concerned with the optical signal performed "through" in the DROP-EAST 45-3 in the optical node B 20B. Likewise, the packet sent from the optical transponder 30-2 in the optical node 20C to the leaf packet sorting unit 80C, is sent to the leaf packet node 70C via the IF 85Z in accordance with the determined result at the step 8201 in FIG. 10.

In this way, when the packet, the destination address of which is the MAC address N to be the multicast address, is transmitted from the leaf packet node 70C, this packet is received by the route packet node A via the transmission path fiber 61. The route packet sorting unit 80A then sends out the multicast packet to the transmission path fiber 60, and the leaf packet node B and leaf packet node C receive this multicast packet.

The route packet node A and leaf packet node B perform the process corresponding to the own nodes if the own nodes belong to the MAC address N. If the own nodes do not belong to the MAC address N, the packet is discarded. The leaf packet node C discards the packet since the transmission source address of the received packet is the MAC address C to be the own node address.

The packet transfer is performed as mentioned above, and the unicast/multicast/broadcast packet transmission from an arbitrary packet node to another arbitrary packet node is realized.

In addition, the wavelength of the optical signal is set to λ1 for the optical multi-drop path, first ordinary optical path and second ordinary optical path, but other wavelengths may be used. In the case of using the other wavelengths, it is required to perform setting appropriately to the transponders in the optical node 20 and the optical switching unit 40. In fact, the optical switching unit 40 in the optical node 20 to be connected with the leaf packet sorting unit 80 on the optical multi-drop path is set such that the optical signal of wavelength set so as to transmit the multicast packet on the optical multi-drop path is performed of "drop" and "through". The optical node 20 positioned at the tail of multi-drop path is set such that the optical signal of its wavelength is performed of "drop" but not of "through".

Embodiment 2

FIG. 11 shows a system configuration in another embodiment of the invention. This system is configured by the optical node 20, the packet sorting unit 80 and the packet node 70, and the respective nodes are connected in the ring shape by the two transmission path fibers 60, 61. The function of the packet sorting unit 80 and packet node 70 is the same as that in the embodiment 1.

FIG. 12 is a configuration diagram of the optical node 20 in this embodiment. Unlike the embodiment 1, the optical node 20 has four optical transponders 30.

In this embodiment, unlike the embodiment 1, a communication path between the packet nodes is doubled to an actually-used system and a redundancy system. The individual packet nodes are connected respectively with two packet sorting units, one is used for the actually-used system, and the other is for the redundancy system. There have been known several methods for a method such that the communication path is doubled to have a redundancy in the packet node, such as STP (SPANNING TREE PROTOCOL) specified in IEEE802. 1D etc. The present invention is applicable to any redundancy methods.

For a purpose of making a redundancy configuration, it is required to set a plurality of optical paths on the transmission path fiber coupled between the optical nodes. However, in this embodiment, the plurality of optical paths are set by using the multiple-wavelength transmission technique for the communication between the optical nodes. By using two types of wavelength in this system, it is possible to set all of the optical paths in the actually-used system and redundancy system from a condition of overlapping the optical paths.

In this embodiment, the optical multi-drop path in the actually-used system uses the wavelength λ1. The optical transponder 30-1 in the optical node 20A is set as the transmission side, and the optical transponder 30-3 in the optical node 20B, optical transponder 30-3 in the optical node 20C and the optical transponder 30-3 in the optical node 20D are set as the reception side.

Further, the optical multi-drop path of the redundancy system uses a wavelength λ2. The optical transponder 30-4 in the optical node 20A is set as the transmission side, and the optical transponder 30-2 in the optical node 20D, optical transponder 30-2 in the optical node 20C and the optical transponder 30-2 in the optical node 20B are set as the reception side.

As the upstream direction optical path in the actually-used system,
  (1) An ordinary optical path uses the wavelength λ1, the optical transponder 30-3 in an optical node D is set as the transmission side, and the optical transponder 30-1 in an optical node C is set as the reception side.
  (2) An ordinary optical path uses the wavelength λ1, the optical transponder 30-3 in the optical node C is set as the transmission side, and the optical transponder 30-1 in the optical node B is set as the reception side.
  (3) An ordinary optical path uses the wavelength λ1, the optical transponder 30-3 in the optical node B is set as the transmission side, and the optical transponder 30-1 in the optical node A is set as the reception side.

Further, as the upstream direction optical path in the redundancy system,
  (1) An ordinary optical path uses the wavelength λ2, the optical transponder 30-2 in the optical node B is set as the transmission side, and the optical transponder 30-4 in the optical node C is set as the reception side.
  (2) An ordinary optical path uses the wavelength λ2, the optical transponder 30-2 in the optical node C is set as the transmission side, and the optical transponder 30-4 in the optical node D is set as the reception side.
  (3) An ordinary optical path uses the wavelength λ2, the optical transponder 30-2 in the optical node D is set as the transmission side, and the optical transponder 30-4 in the optical node A is set as the reception side.

Embodiment 3

FIG. 13 shows a system configuration in another embodiment of the invention. This system is configured by the optical node 20, the packet sorting unit 80 and the packet node 70, and the respective optical nodes are connected in the ring shape by the two transmission path fibers 60, 61. The function of the packet sorting unit 70 is the same as that in the embodiment 2, but an operation of the optical node 20 and packet sorting unit 80 is different from that of the embodiment 2.

When the video delivery is applied to the present system as a main application, it is assumed that data amount from the route packet node in the downstream direction is considerably greater than that in the upstream direction. Therefore, plural classes of optical transponders, each of which has different a transfer rate, are mounted on the optical node. In consequence, a high rate optical transponder is used for the transmission path in the downstream direction, and a low rate optical transponder is used for the transmission path in the upstream direction, therefore, it is possible to make a total cost of the system small.

In addition, the high and low rate optical transponder called in here is that this means a relative speed coincidentally. It does not mean that the transmission rate as an absolute value is the high/low rate.

In this embodiment, the optical transponders 30-1 and 30-4 in the optical node 20A and the optical transponders 30-2 and 30-3 in the optical nodes 20B to 20D, are the high rate optical transponder, and other than that is the low rate optical transponder.

FIG. 14 is a configuration diagram of the optical node 20A in this embodiment. Likewise to the embodiment 2, the optical node 20 has four optical transponders 30, but the connection between the optical switching unit 40 and the optical transponder 30 is different from that in the embodiment 2. Generally, a transmission unit and a reception unit in the optical transponder are connected in wire of a combination, such as the ADD-WEST portion wavelength selectable switch 45-1 and DROP-WEST portion wavelength selectable switch 45-2, the ADD-EAST portion wavelength selectable switch 45-4 and DROP-EAST portion wavelength selectable switch 45-3. However, in the configuration of this embodiment, the transmission unit is connected with the ADD-WEST portion wavelength selectable switch 45-1 and the reception unit is connected with the DROP-EAST portion wavelength selectable switch 45-3 in the optical transponder 30-2 in the optical node 20A. In the optical transponder 30-3, the transmission unit is connected with the ADD-EAST portion wavelength selectable switch 45-4 and the reception unit is connected with the DROP-WEST portion wavelength selectable switch 45-2.

FIG. 15 is a configuration diagram of the optical nodes 20B to 20D in this embodiment. In the optical nodes 20B to 20D, the transmission unit is connected with the ADD-EAST portion wavelength selectable switch 45-4 and the reception unit is connected with the DROP-WEST portion wavelength selectable switch 45-2 in the optical transponder 30-1. The transmission unit is connected with the ADD-WEST portion wavelength selectable switch 45-1 and the reception unit is connected with the DROP-EAST portion wavelength selectable switch 45-3 in the optical transponder 30-4.

In this way, the low rate optical transponders are used in the optical transponder to be used for the reception of the upstream direction optical path, and these low rate optical transponders are configured to connect across the WDM optical switching unit.

An operation of the packet sorting unit in this embodiment will be shown with reference to FIG. 16 to FIG. 19.

FIG. 16 shows an operational outline of the route packet sorting unit. The packet sorting unit 80 has three packet IFs 85. However, in the route packet sorting unit, the packet IF 85X is connected with the downstream direction optical transponder (port X). The packet IF 85Y is connected with the upstream direction optical transponder (port Y). The packet IF 85Z is connected with the route packet node (port Z). The downstream direction optical transponder does not require having the function for receiving the signal from the optical transmission path, and the upstream direction optical transponder does not require having the function for transmitting the signal to the optical transmission path.

Operation detail of the packet transfer control unit 81 in a route packet sorting unit 80A-1 is shown in a flowchart in FIG. 18.

First, the packet transfer control unit 81 in the route packet sorting unit 80A-1 confirms whether an input is present from the packet IF 85Y (8301). If the input is present, the packet transfer control unit 81 checks whether the destination address of the input packet is the unicast address (8302). If it is other than the unicast (multicast or broadcast), the packet transfer control unit 81 copies the input packet to output to both the packet IF 85X and packet IF 85Z. If the destination address is the unicast address, the packet transfer control unit 81 compares the value of destination address of the input packet with the value in the address storing unit 82 (8303). If the values are coincident, the input packet is output to the packet IF 85Z (8305). If the values are not coincident, the input packet is output to the packet IF 85X (8306).

Finally, the packet transfer control unit 81 confirms whether the input is present from the packet IF 85Z (8307). If the input is present, the input packet is output to the packet IF 85X (8308). Thereafter the process returns to the step 8301 and continues.

FIG. 17 shows an operation outline of the leaf packet sorting unit 80B-1. The packet sorting unit 80 has three packet IFs 85. In the leaf packet sorting unit, the packet IF 85X is connected with the downstream direction optical transponder (port X), the packet IF 85Y is connected with the upstream direction optical transponder (port Y), and the packet IF 85Z is connected with the leaf packet node (port Z). The downstream direction optical transponder does not require having the function for receiving the signal from the optical transmission path.

An operation detail of the packet transfer control unit 81 in the leaf packet sorting unit 80B-1 shows in a flowchart of FIG. 19. First, the packet transfer control unit 81 checks whether the input is present from the packet IF 85X (8401). If the input is present, the input packet is output to the packet IF 85Z (8402).

Next, the packet transfer control unit 81 checks whether the input is present from the packet IF 85Y (8403). If the input is present, the input packet destination address is checked whether it is the unicast address (8404). If the input packet destination address is other than the unicast, the input packet is output to the packet IF 85Y (8405). If it is the unitcast, the packet transfer control unit 81 compares the value of the destination address of the input packet with the value in the address storing unit 82 (8406). If the compared addresses are coincident, the packet transfer control unit 81 outputs the input packet to the packet IF 85Z (8407). If the addresses are not coincident, the input packet is transferred to the packet IF 85Y (8408).

Finally, the packet transfer control unit 81 checks whether the input is present from the packet IF 85Z (8409). If the input is present, the input packet is output to the packet IF 85Y (8410), and the process returns to the step 8401 and continues.

In this embodiment, the optical multi-drop path in the actually-used system uses the wavelength λ1. The optical transponder 30-1 in the optical node 20A is set as the transmission side. The optical transponder 30-3 in the optical node 20B, optical transponder 30-3 in the optical node 20C and optical transponder 30-3 in the optical node 20D are set as the reception side. The optical multi-drop path in the redundancy system uses the wavelength λ2. The optical transponder 30-4 in the optical node 20A is set as the transmission side. The optical transponder 30-2 in the optical node 20D, optical transponder 30-2 in the optical node 20C and optical transponder 30-2 in the optical node 20B are set as the reception side.

Further, as the upstream direction optical path in the actually-used system, (1) An ordinary optical path uses the wavelength λ1, the optical transponder 30-1 in the optical node D is set as the transmission side, and the optical transponder 30-1 in the optical node C is set as the reception side.
(2) An ordinary optical path uses the wavelength λ1, the optical transponder 30-1 in the optical node C is set as the transmission side, and the optical transponder 30-1 in the optical node B is set as the reception side.
(3) An ordinary optical path uses the wavelength λ1, the optical transponder 30-1 in the optical node B is set as the transmission side, and the optical transponder 30-1 in the optical node A is set as the reception side.

Furthermore, as the upstream direction optical path in the redundancy system, (1) An ordinary optical path uses the wavelength λ2, the optical transponder 3-4 in the optical node B is set as the transmission side, and the optical transponder 30-4 in the optical node C is set as the reception side.
(2) An ordinary optical path uses the wavelength λ2, the optical transponder 30-4 in the optical node C is set as the transmission side, and the optical transponder 30-4 in the optical node D is set as the reception side.
(3) An ordinary optical path uses the wavelength λ2, the optical transponder 30-4 in the optical node D is set as the transmission side, and the optical transponder 30-4 in the optical node A is set as the reception side.

Hereinafter, a specific example of the packet transfer process will be described in this embodiment. The following example shows a packet flow in the actually-used system.

The MAC address of an actually-used system IF in the route packet node 70A is set as the MAC address A. The MAC address of the actually-used system IF in the leaf packet node 70B is set as the MAC address B. The MAC address of the actually-used system IF in the leaf packet node C is set as the MAC address C. The MAC address of the actually-used system IF in the leaf packet node D is set as the MAC address D. The destination address of the packet for performing the multicast transmission from the route packet node 70A to the other packet nodes is set to the MAC address M. The destination address of the packet performed the multicast transmission to the other packet nodes by the leaf packet node C is set as the MAC address N. The MAC addresses A to D are addresses, the I/G bit of which becomes "0" and the MAC addresses M to N are addresses, the I/G bit of which becomes "1".

Since the MAC address of the packet nodes is mentioned above, the MAC address A is stored in the address storing unit 82 in the packet sorting unit 80A-1, the MAC address B is stored in the address storing unit 82 in the packet sorting unit 80B-1, the MAC address C is stored in the address storing unit 82 in a packet sorting unit 80C-1, and the MAC address D is stored in the address storing unit 82 in a packet sorting unit 80D-1.

First, a description will be concerned with the case where the unicast packet is transmitted from the route packet node 70A to the leaf packet node 70C. When the packet, the transmission source address of which is the MAC address A and the destination address of which is the MAC address C, is transmitted from the route packet node 70A, this packet first enters the packet IF 85Z in the route packet sorting unit 80A-1. The entered packet is output from the packet IF 85X in accordance with the determined result at a step 8307 in FIG. 18 to be entered into the optical transponder 30-1 in the optical node 20A. The optical transponder 30-1 converts the entered packet data into the optical signal to transmit to the transmission path fiber 60 via the optical switching unit 40. The optical signal is delivered to the optical node 20B via the transmission path fiber 60, and sent to optical node 20C via the optical transponder 30-3 and the transmission path fiber 60 by the optical switching unit 40. The optical node 20C sends the optical signal received from the transmission path fiber 60 to the optical node 20D via the optical transponder 30-3 and transmission path fiber 60 by the optical switching unit 40. The optical node 20D sends the optical signal received from the transmission path fiber 60 to the optical transponder 30-3 via the optical switching unit 40.

The optical transponder 30-2 in the optical node 20B converts the received optical signal into the packet data to send to the packet IF 85X in the leaf packet sorting unit 80-1B. The leaf packet sorting unit 80B-1 outputs the received packet from the packet IF 85Z in accordance with the determined result at the step 8401 in FIG. 19. The packet sent from the packet IF 85Z in the leaf packet sorting unit 80B-1 is delivered to the leaf packet node 70B, however, the packet is discarded in the leaf packet node 70B since the destination address of the packet is the MAC address C different from the MAC address of the leaf packet node 70B.

In contrast, the packet sent to the leaf packet sorting unit 80C-1 from the optical transponder 30-2 in the optical node 20C is also sent to the leaf packet 70C in accordance with the determined result at the step 8401 in FIG. 19. However, the leaf packet node C recognizes that the packet is a packet addressed to the own node since the destination address of the packet is coincident with the own MAC address, and performs the process corresponding to the packet contents.

Further, the packet sent to the leaf packet sorting unit 80D-1 from the optical transponder 30-2 in the optical node 20D is also sent to the leaf packet 70D in accordance with the determined result at the step 8401 in FIG. 19. However, the packet is discarded in the leaf packet node 70D since the destination address of the packet is the MAC address C different from the MAC address of the leaf packet node 70D.

Next, a description will be concerned with the case where the multicast packet is transmitted from the route packet node 70A. When the packet, the transmission source address of which is the MAC address A and the destination address of which is the MAC address M to be multicast address, is transmitted from the route packet node 70A, this packet is sent to all of the leaf packet nodes, including the leaf packet node B, leaf packet node C and leaf packet node D, by the same process as mentioned above. The respective leaf packet nodes perform the process corresponding to the own node if the own node belongs to the MAC address M, but discard the packet if the own node does not belong to the MAC address M.

Next, a description will be concerned with the case where the unicast packet is transmitted from the leaf packet node 70C to the route packet node 70A. When the packet, the transmission source address of which is the MAC address C and the destination address of which is the MAC address A, is transmitted from the leaf packet node 70C, this packet first enters the packet IF 85Z in the leaf packet sorting unit 80C-1. The entered packet is output from the packet IF 85Y in accordance with the determined result at the step 8409 in FIG. 19 to then enter the optical transponder 30-1 in the optical node 20C. The packet data is converted into the optical signal to be sent to the optical transponder 30-1 in the optical node 20B via the optical switching unit 40 in the optical node 20C, transmission path fiber 61, and the optical switching unit 40 in the optical node 20B, and again converted into the packet data to be sent to the packet IF 85Y in the leaf packet sorting unit 80B-1.

In the leaf packet sorting unit 70B-1, since the MAC address A to be the destination address of the packet is different from the MAC address B to be the value of the MAC address stored in the address storing unit 82 in the leaf packet sorting unit 70B-1, the determined result becomes NO at the step 8406 in FIG. 19, therefore, the process proceeds to the step 8408 and the packet is output from the packet IF 85Y to be sent to the optical transponder 30-1 in the optical node 20B. The packet data is converted into the optical signal to be sent to the optical transponder 30-3 in the optical node 20A via the optical switching unit 40 in the optical node 20B, transmission path fiber 60, and the optical switching unit 40 in the optical node 20A, and again converted into the packet data to be sent to the packet IF 85Y in the route packet sorting unit 80A-1.

In the route packet sorting unit 80A-1, since the MAC address A to be destination address of the packet is coincident with the MAC address A to be the value of the MAC address stored in the address storing unit 82 in the route packet sorting unit 80A-1, the determined result at a step 8303 in FIG. 18 is YES. The process then proceeds to a step 8305, and the packet is output from the packet IF 85Z to be sent to the route packet node 70A. The route packet node A recognizes that the packet is a packet addressed to the own node to then perform the process corresponding to the packet contents since the destination address of the packet is coincident with the destination address of the packet.

Next, a description will be concerned with the case where the unicast packet is transmitted from the leaf packet node 70B to the leaf packet node 70C. When the packet, the transmission source address of which is the MAC address B and the destination address of which is the MAC address C, is transmitted from the leaf packet node 70B, this packet first enters the packet IF 85Z in the leaf packet sorting unit 80B-1. The entered packet is output from the packet IF 85Y in accordance with the determined result at the step 8409 in FIG. 19 to be entered into the optical transponder 30-2 in the optical node 20B. The packet data is converted into the optical signal to be sent to the optical transponder 30-3 in the optical node 20A via the optical switching unit 40 in the optical node 20B, transmission path fiber 61, optical switching unit 40 in the optical node 20A, and again converted into the packet data to be sent to the packet IF 85Y in the route packet sorting unit 80A-1.

In the route packet sorting unit 80A-1, since the MAC address C to be the destination address of the packet is different from the MAC address A to be the value of the MAC address stored in the address storing unit 82 in the route packet sorting unit 80A, the determined result at the step 8303 in FIG. 18 is NO. The process then proceeds to a step 8306, and the packet is output from the packet IF 85X to be sent to the optical transponder 30-1 in the optical node 20A. The packet data is converted into the optical signal to be sent to the optical switching unit 40 in the optical node 20A, transmission path fiber 60 and the optical switching unit 40 in the optical node 20B and sent to both the optical transponder 30-3 and transmission path fiber 60 by the optical switching unit 40. The optical node 20C sends the optical signal received from the transmission path fiber 60 to both the optical transponder 30-3 and transmission path fiber 60 via the optical switching unit 40. The optical node 20D sends the optical signal received from the transmission path fiber 60 to the optical transponder 30-3 via the optical switching unit 40.

The optical transponder 30-2 in the optical node 20B converts the received optical signal into the packet data to send to the packet IF 85X in the leaf packet sorting unit 80B-1. The leaf packet sorting unit 80B-1 outputs the receive packet from the packet IF 85Z in accordance with the determined result at the step 8401 in FIG. 19. The packet sent from the packet IF 85Z in the leaf packet sorting unit 80B-1 is delivered to the leaf packet node 70B. However, the packet is discarded in the leaf packet node 70B since the destination address of this packet is the MAC address C different from the MAC address of the leaf packet node 70B.

In contrast, the packet sent from the optical transponder 30-2 in the optical node 20C to the leaf packet sorting unit 80C-1 is also sent to the leaf packet 70C in accordance with the determined result at the step 8401 in FIG. 19. However, the leaf packet node C recognizes that this packet is a packet addressed to the own node to perform the process corresponding to the packet contents since the destination address of the packet is coincident with the own MAC address.

Further, the packet sent from the optical transponder 30-2 in the optical node 20D to the leaf packet sorting unit 80D-1 is also sent to the leaf packet 70D in accordance with the determined result at the step 8401 in FIG. 19. However, this packet is discarded in the leaf packet node 70D since the destination address o this packet is the MAC address C different from the MAC address of the leaf packet node 70D.

Next, a description will be concerned with the case where the multicast packet is transmitted from the leaf packet node 70C. When the packet, the transmission source address of which is the MAC address C and the destination address of which is the MAC address N to be the multicast address, is transmitted from the leaf packet node 70C, this packet first enters the packet IF 85Z in the leaf packet sorting unit 80C-1. The entered packet is output from the packet IF 85Y in accordance with the determined result at the step 8409 in FIG. 19 to enter the optical transponder 30-1 in the optical node 20C. The packet data is converted into the optical signal to be sent to the optical transponder 30-1 in the optical node 20B via the optical switching unit 40 in the optical node 20C, transmission path fiber 61 and the optical switching unit 40 in the optical node 20B, and again converted into the packet data to be sent to the packet IF 85Y in the leaf packet sorting unit 80B-1.

In the leaf packet sorting unit 70B, since the MAC address N to be the destination address of the packet is the multicast address, the determined result at the step 8404 in FIG. 19 is NO. The process then proceeds to the step 8405 and the packet is output from the packet IF 85X to be sent to the optical transponder 30-1 in the optical node 20B. The packet data is converted into the optical signal to be sent to the optical transponder 30-3 in the optical node 20A via the optical switching unit 40 in the optical node 20B, transmission path fiber 61, and the optical switching unit 40 in the optical node 20A, and again converted into the packet data to be sent to the packet IF 85Y in the route packet sorting unit 80A-1.

In the route packet sorting unit 80A-1, since the MAC address N to be the destination address of packet is the multicast address, the determined result at a step 8302 in FIG. 18 is NO. The process therefore proceeds to a step 8304, and the packet is output from the packet IF 85X and packet IF 85Z. The packet data output from the packet IF 85Z is sent to the route packet node 70A, and the packet data output from the packet IF 85X is sent to the optical transponder 30-1 in the optical node 20A. The packet data is converted into the optical signal to be sent to the optical switching unit 40 in the optical node 20A, transmission path fiber 60 and optical switching unit 40 in the optical node 20B and also sent to both the optical transponder 30-3 and transmission path fiber 60 by the optical switching unit 40.

The optical node 20C sends the optical signal received from the transmission path fiber 60 to both the optical transponder 30-3 and transmission path fiber 60 via the optical switching unit 40. The optical node 20D sends the optical signal received from the transmission path fiber 60 to the optical transponder 30-3 via the optical switching unit 40.

The optical transponder 30-2 in the optical node 20B converts the received optical signal into the packet data to send to the packet IF 85X in the leaf packet sorting unit 80B-1. The leaf packet sorting unit 80B-1 outputs the received packet from the packet IF 85Z in accordance with the determined result at the step 8401 in FIG. 19. The packet sent from the packet IF 85Z in the leaf packet sorting unit 80B is delivered to the leaf packet node 70B.

Likewise, the packet sent to the leaf packet sorting unit 80C-1 from the optical transponder 30-3 in the optical node 20C is sent to the leaf packet 70C, and the packet sent from the optical transponder 30-3 in the optical node 20D to the leaf packet sorting unit 80D-1 is sent to the leaf packet 70D.

In this way, when the packet, the destination address of which is the MAC address N to be the multicast address, is transmitted from the leaf packet node 70C, this packet is sent to all of the route packet node A, leaf packet node B, leaf packet node C, and leaf packet node D.

The route packet node A, leaf packet node B and leaf packet node D perform respectively the corresponding process in the own nodes if the own node belongs to the MAC address N, and discard the packet if the own node does not belong to the MAC address N. The leaf packet node C discards the packet since the transmission source address of the received packet is the MAC address C to be the own node address.

The above-mentioned packet transfer is performed to realize the unicast/multicast/broadcast packet transmission from arbitrary packet node to another arbitrary packet node.

In this embodiment, the high rate optical transponder is used in the downstream direction, toward which the data transfer amount is large and the low rate optical transponder is used in the upstream direction, toward which the data transfer amount is small. In consequence, an inexpensive low rate optical transponder can be used while the transfer capability is maintained in the system, so that it is possible to reduce a total cost in the system.

Further, since the high rate optical transponder on the route packet node side does not require having the reception function and the high rate optical transponder on the leaf packet node side does not require having the transmission function, a transmission-dedicated high rate optical transponder and a reception-dedicated low rate optical transponder are provided respectively to be able to further reduce the cost.

As mentioned above, the optical multicast system described in the embodiments 1 to 3 can effectively realize the one-to-N packet transfer by using the drop and continue function of the optical transmission signal. At that time, in a packet layer, it is not required to change a high-order protocol since the function is realized equivalent to the existing bidirectional multicast communication function. Therefore, it is remarkably effective to perform P2P, the video delivery, etc. by the optical transmission system.

The above-mentioned description has been concerned with the embodiments, however, the invention is not limited thereto and it is apparent for person skilled in the art that various changes and modifications may be made within spirit of the invention and the scope of the appended claims.

Figure 1:
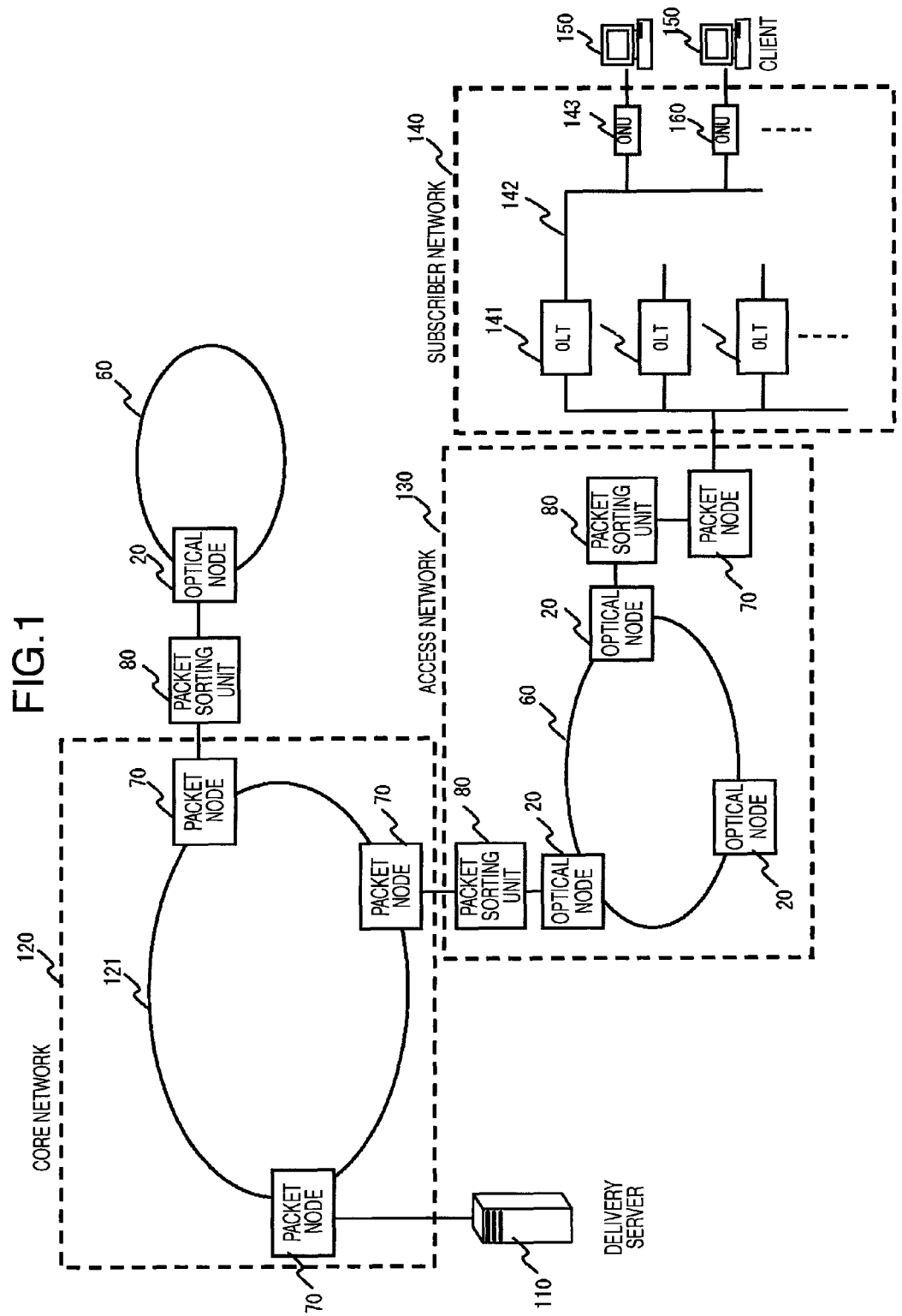
[FIG. 1] A configuration diagram in one embodiment of a video delivery system using the invention.
Figure 2:
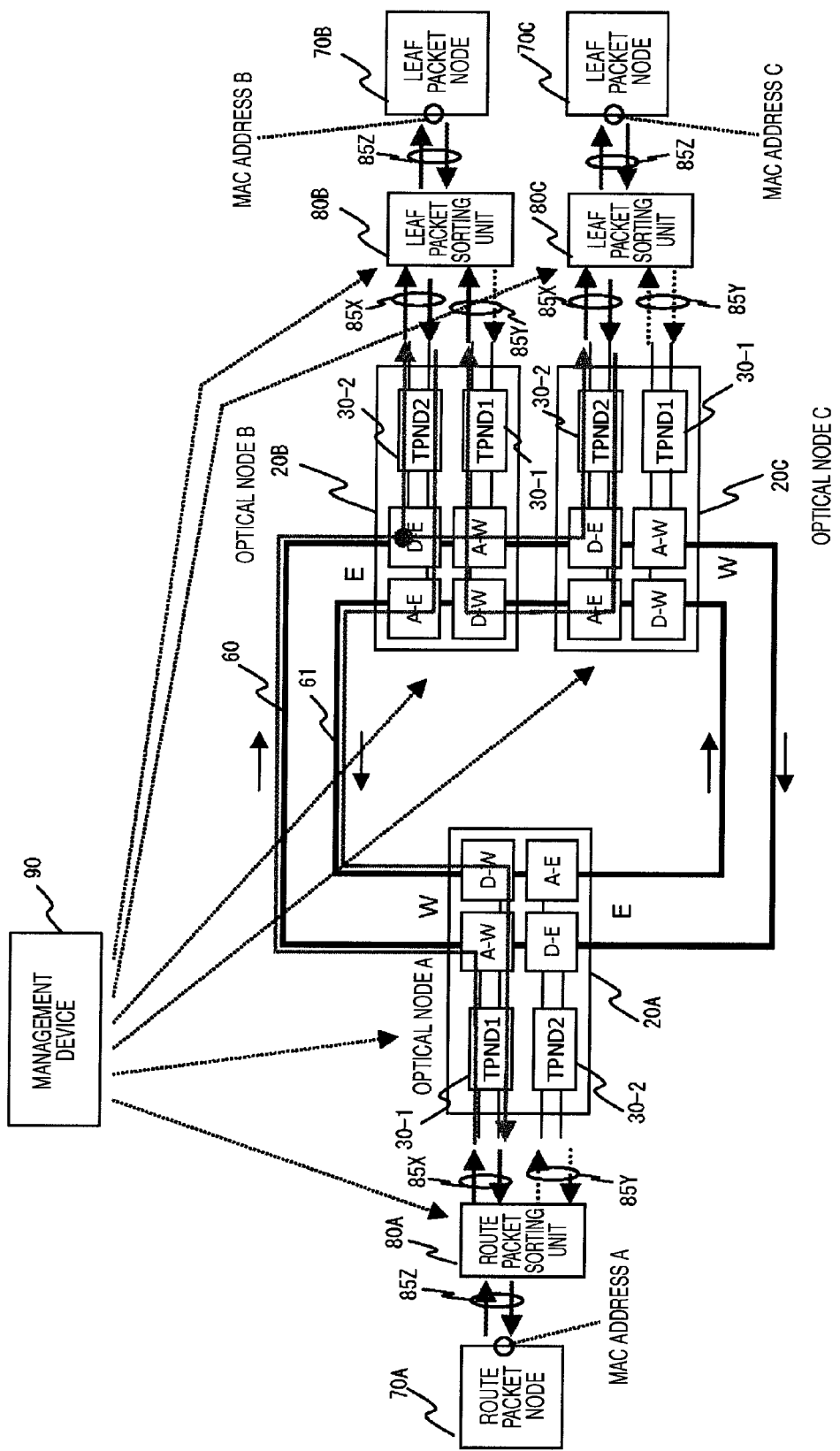
[FIG. 2] A system configuration diagram in one embodiment of the invention.
Figure 3:
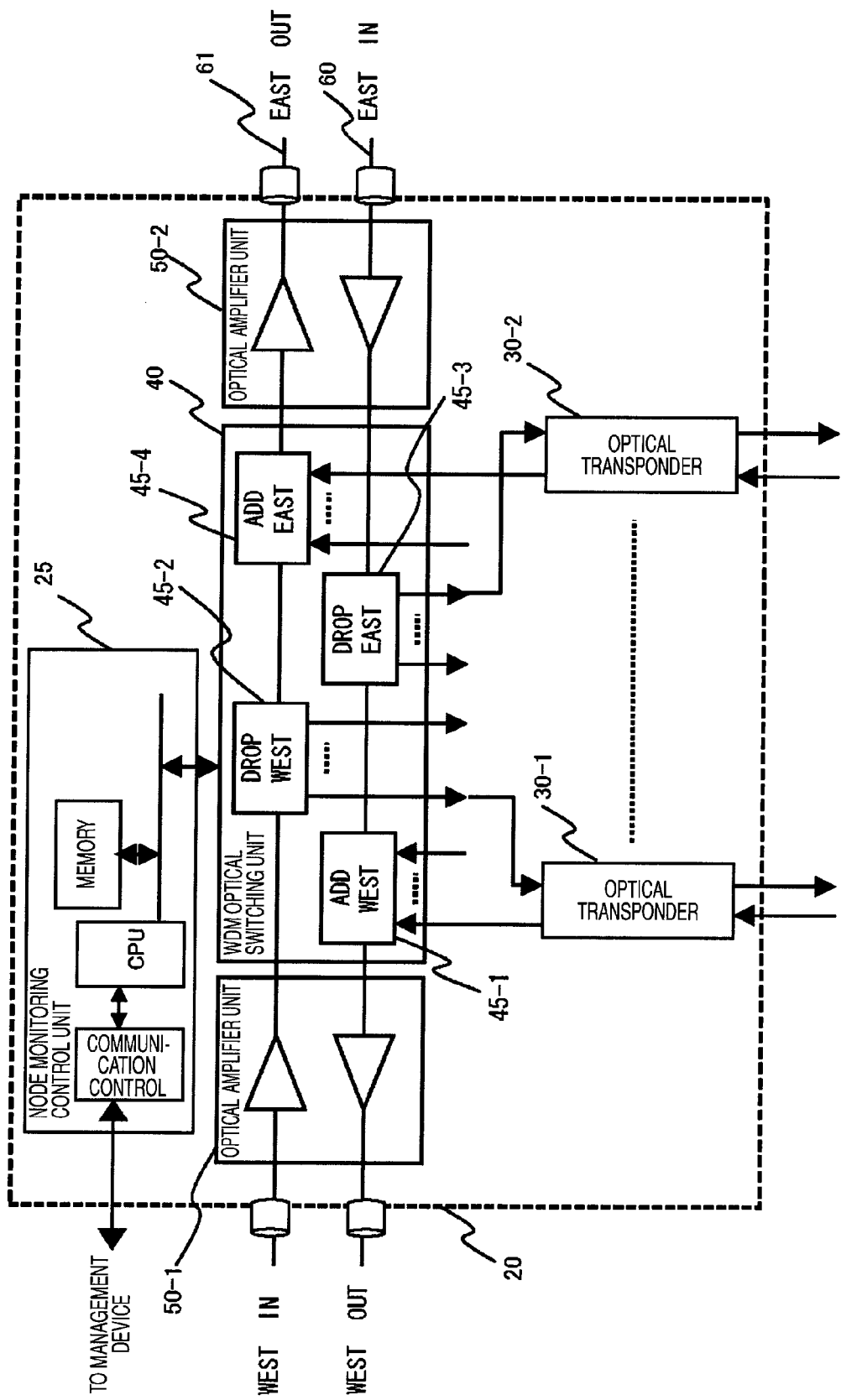
[FIG. 3] One configuration example of an optical node 20.
Figure 4:
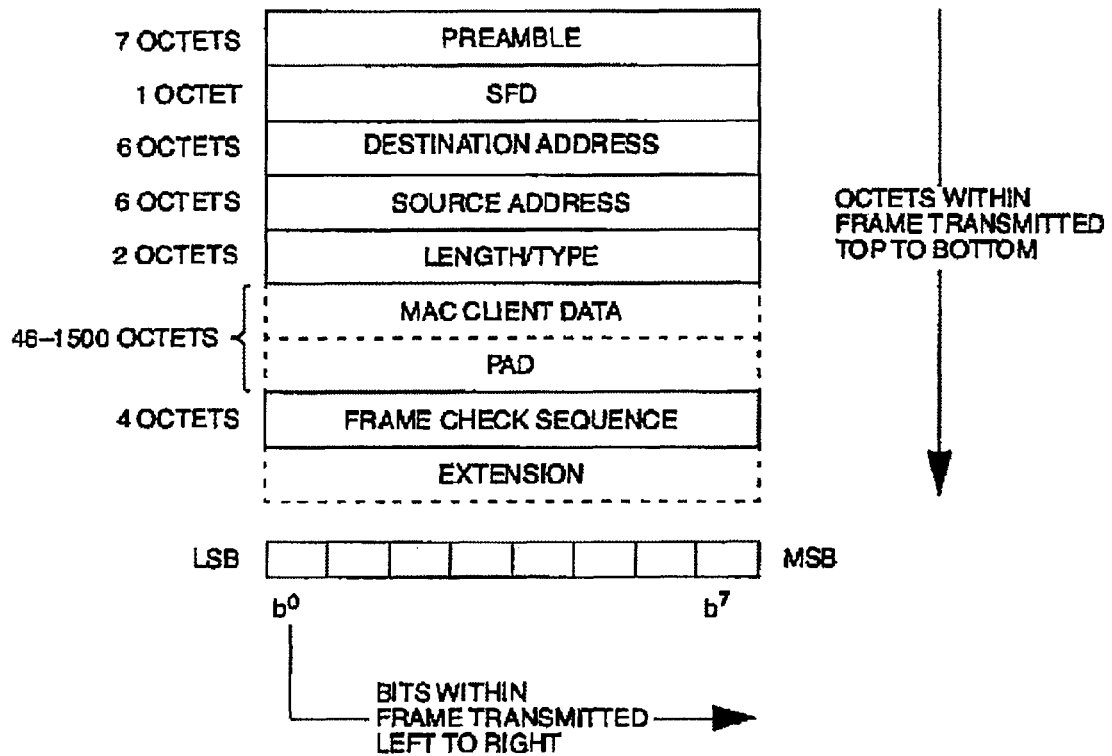
[FIG. 4] A diagram showing a packet data format in Ethernet.
Figure 5:
[FIG. 5] A diagram showing an address format in Ethernet.
Figure 6:
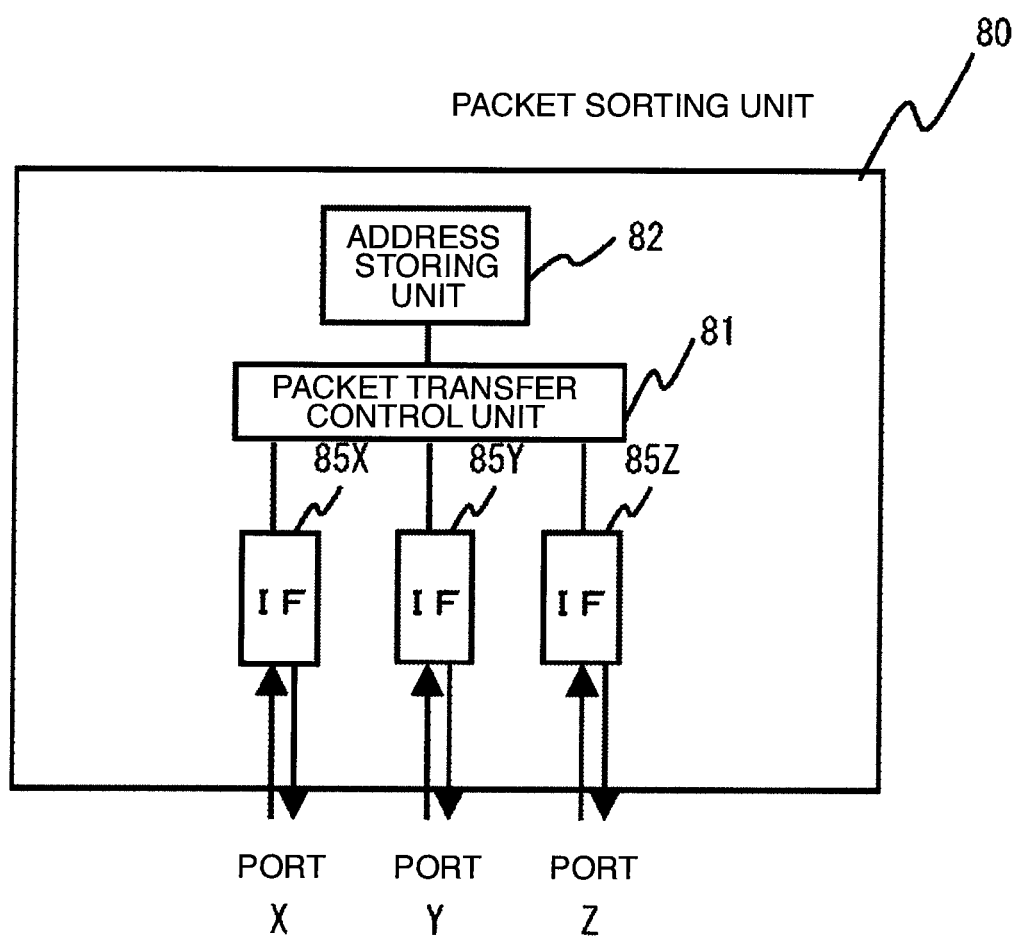
[FIG. 6] One configuration example of a packet sorting unit 80.
Figure 7:
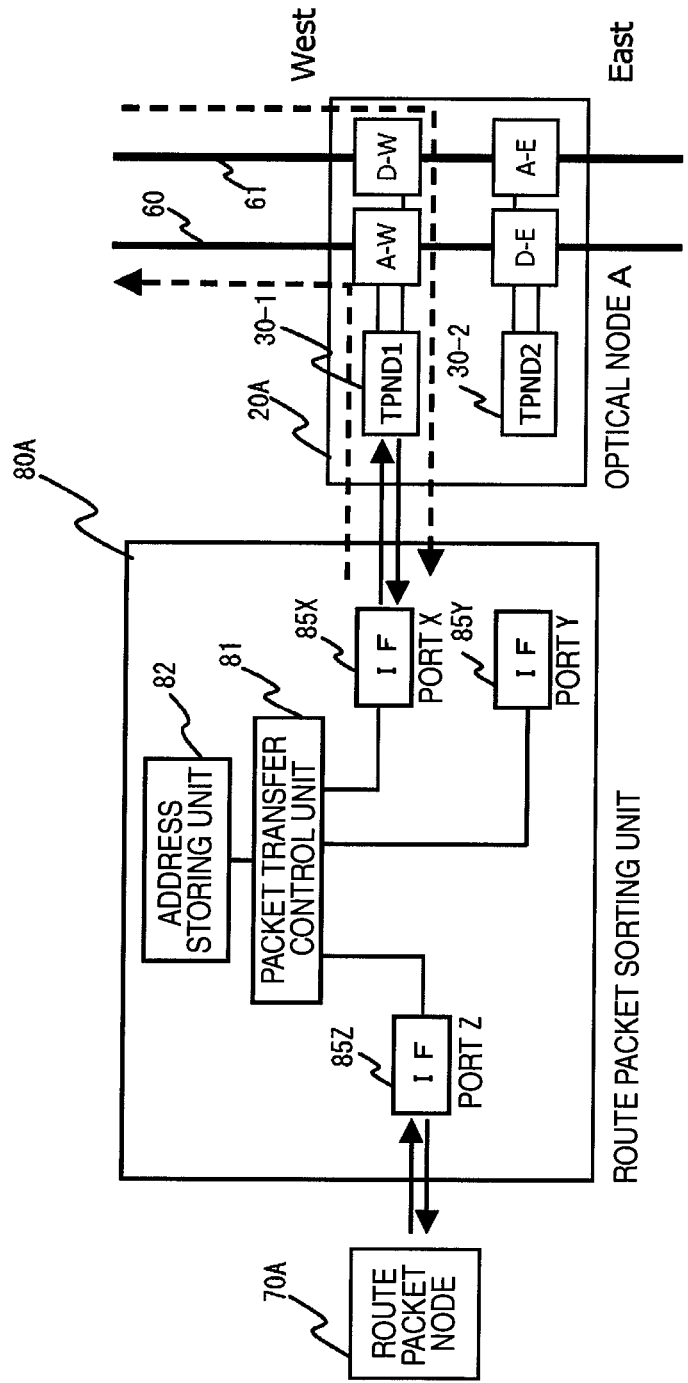
[FIG. 7] A diagram showing one example of a connecting relation between a route packet sorting unit and an optical node.
Figure 8:
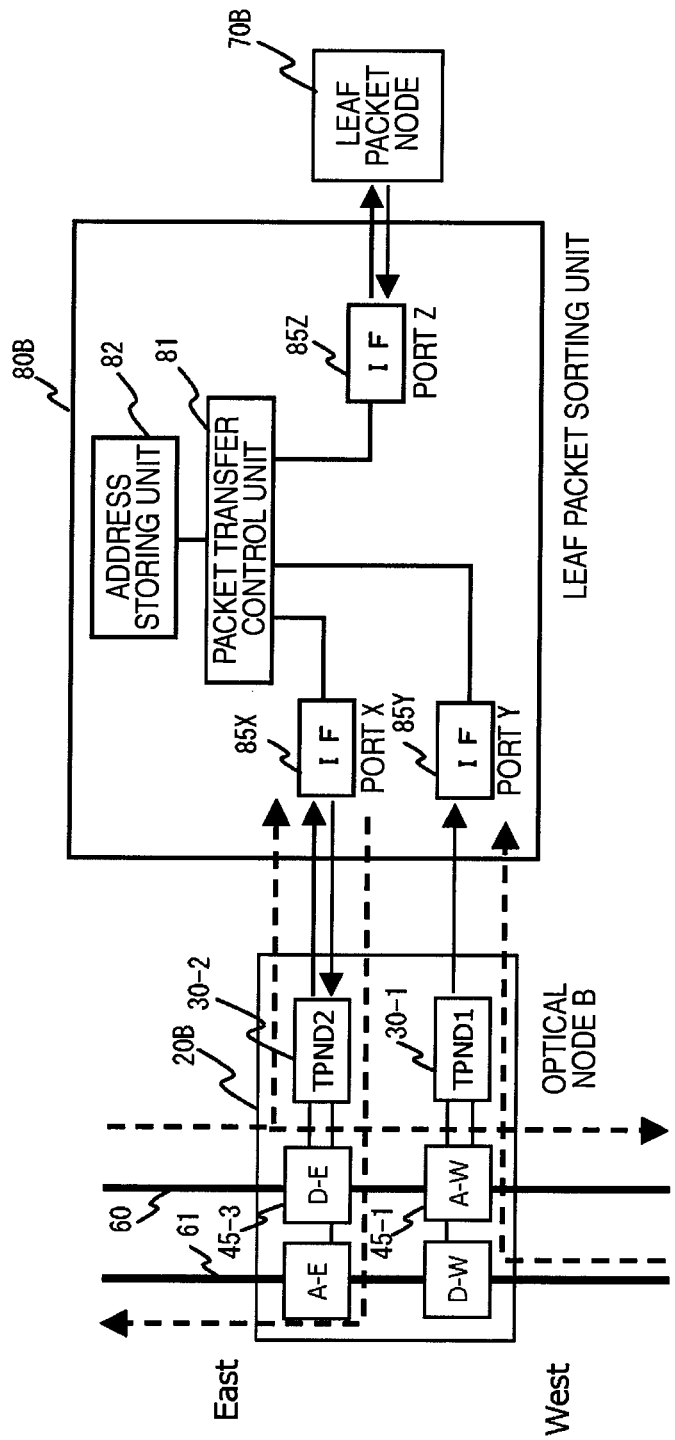
[FIG. 8] A diagram showing one example of a connecting relation between a leaf packet sorting unit and the optical node.
Figure 9:
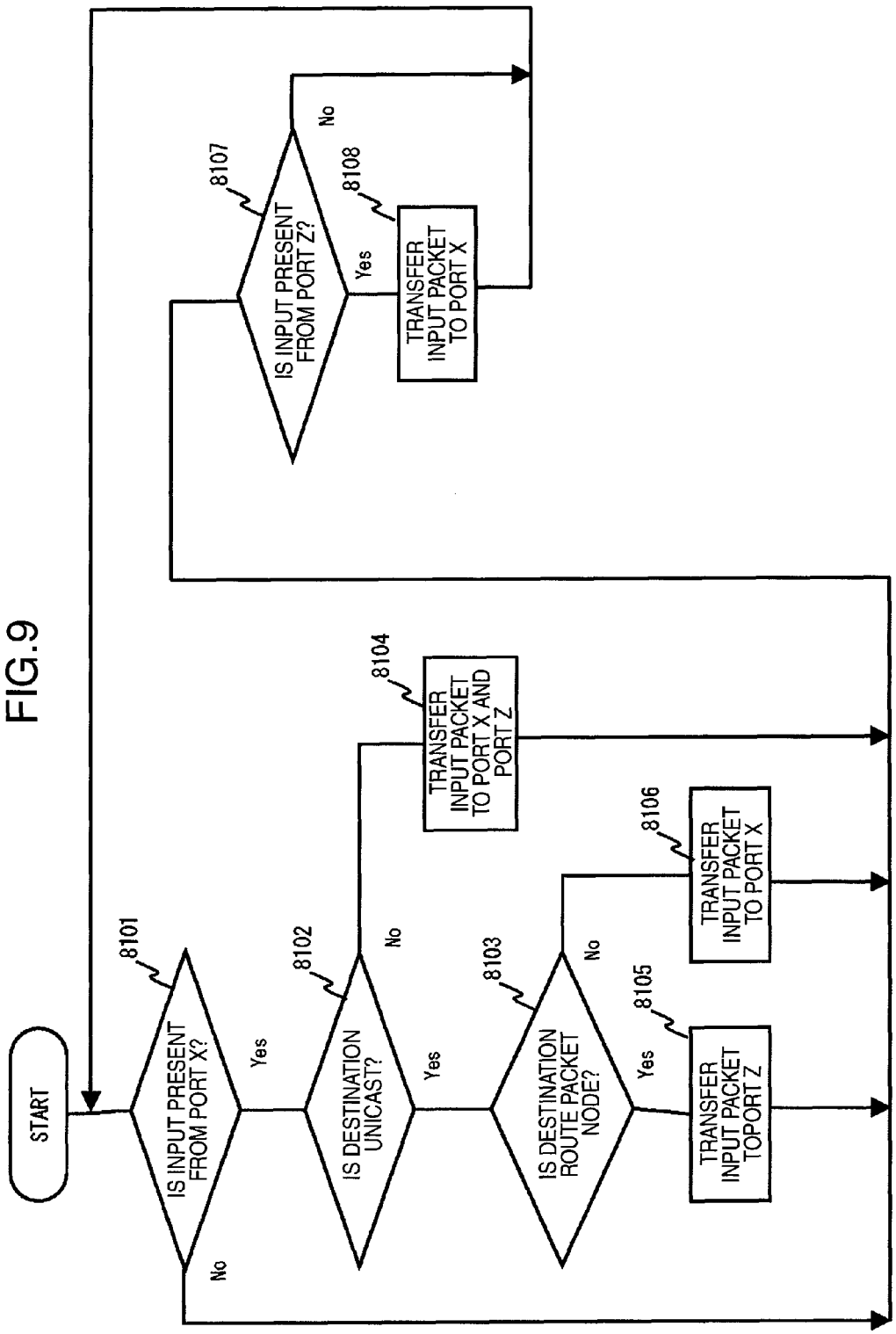
[FIG. 9] An example of a flowchart for the route packet sorting unit.
Figure 10:
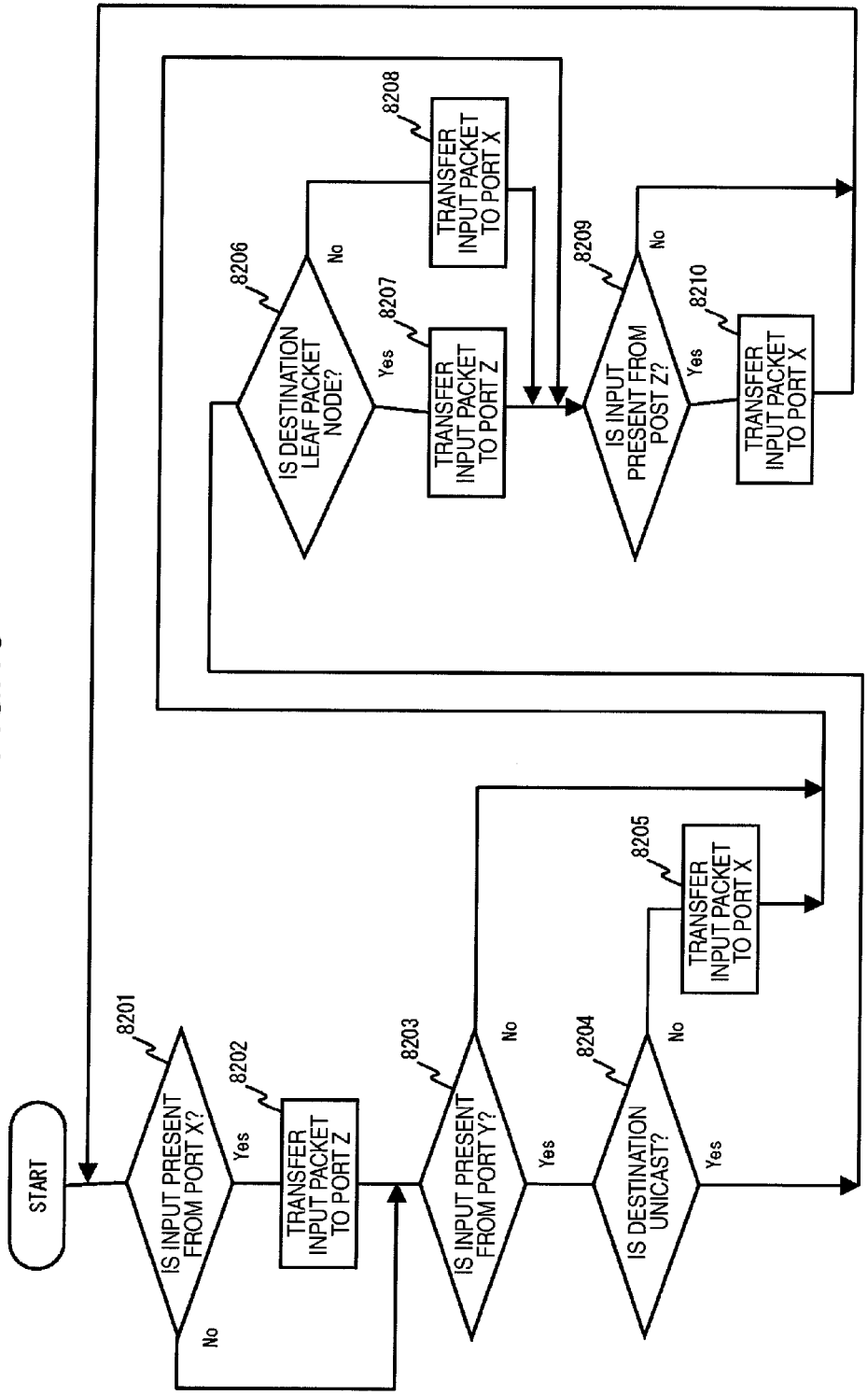
[FIG. 10] An example of a flowchart for a process of the leaf packet sorting unit.
Figure 11:
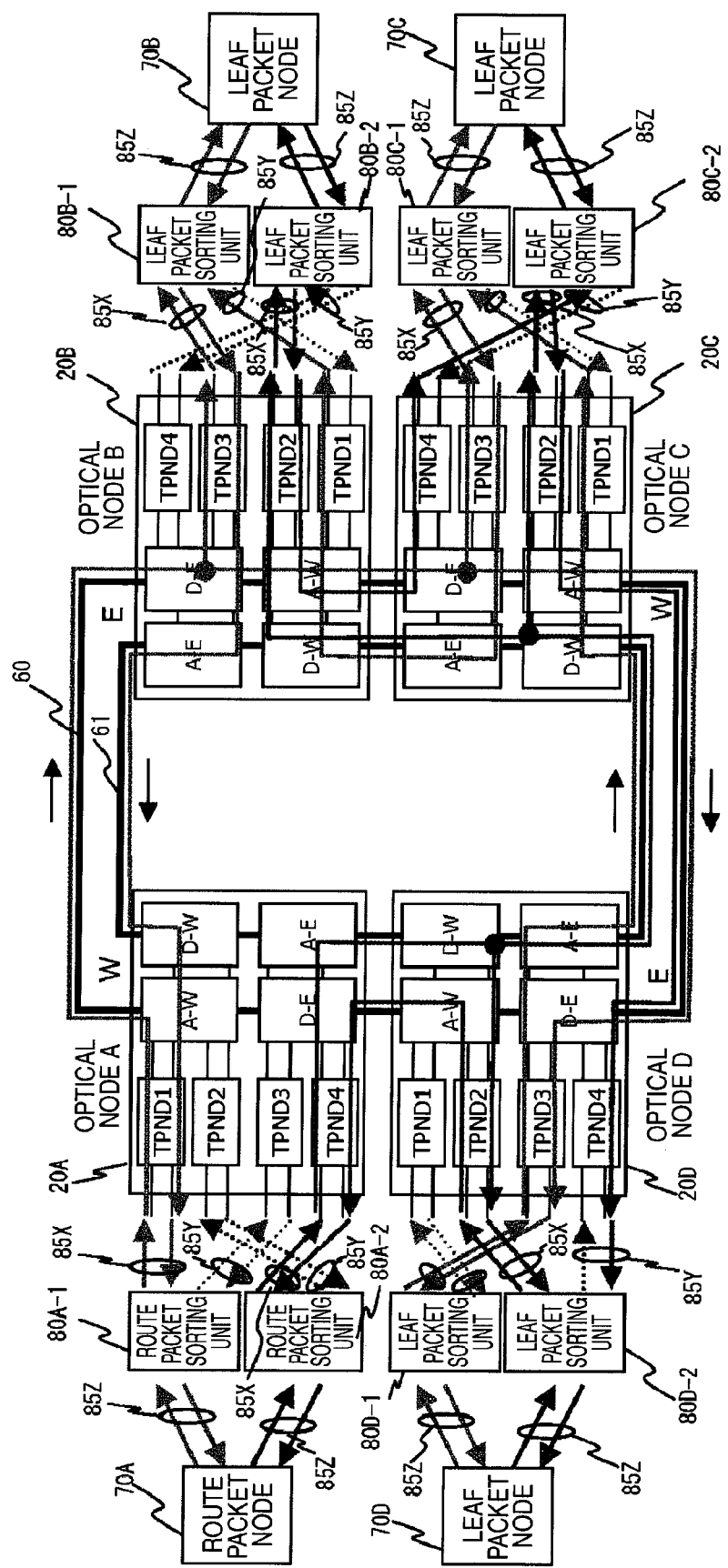
[FIG. 11] a system configuration diagram in a second embodiment of the invention.
Figure 12:
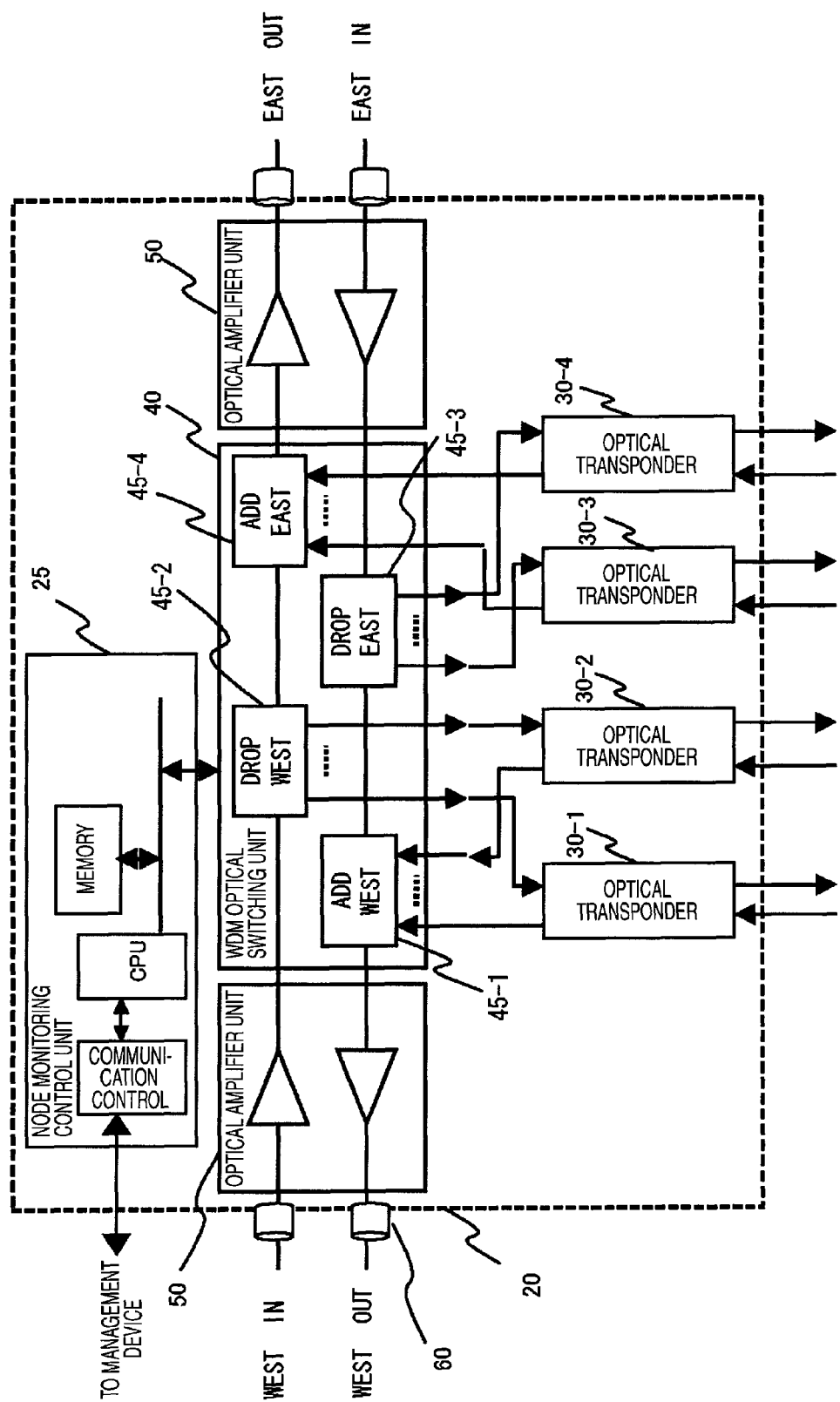
[FIG. 12] A configuration diagram of the optical node 20 in the second embodiment.
Figure 13:
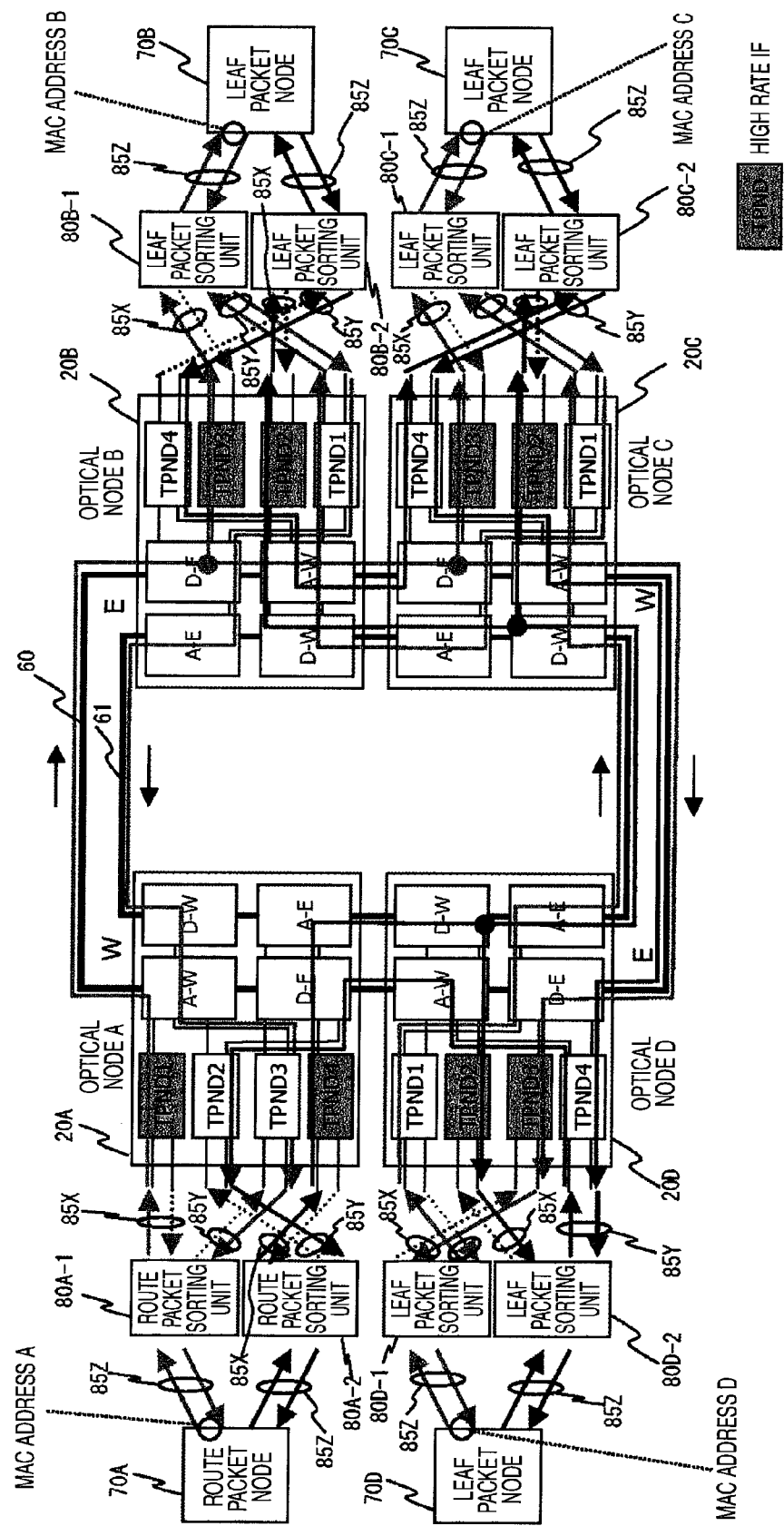
[FIG. 13] A system configuration diagram in a third embodiment of the invention.
Figure 14:
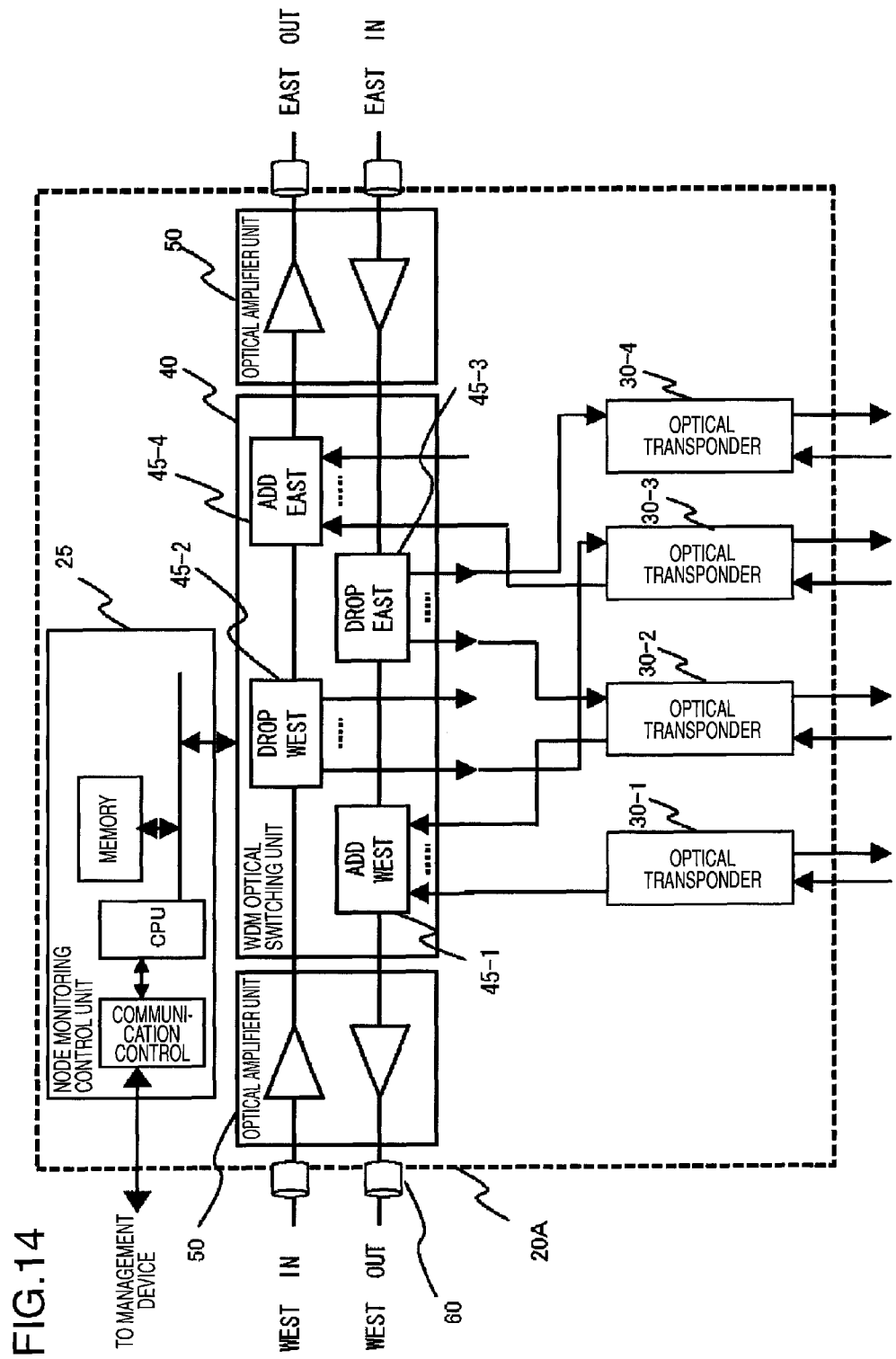
[FIG. 14] A configuration diagram of an optical node 20A in the third embodiment.
Figure 15:
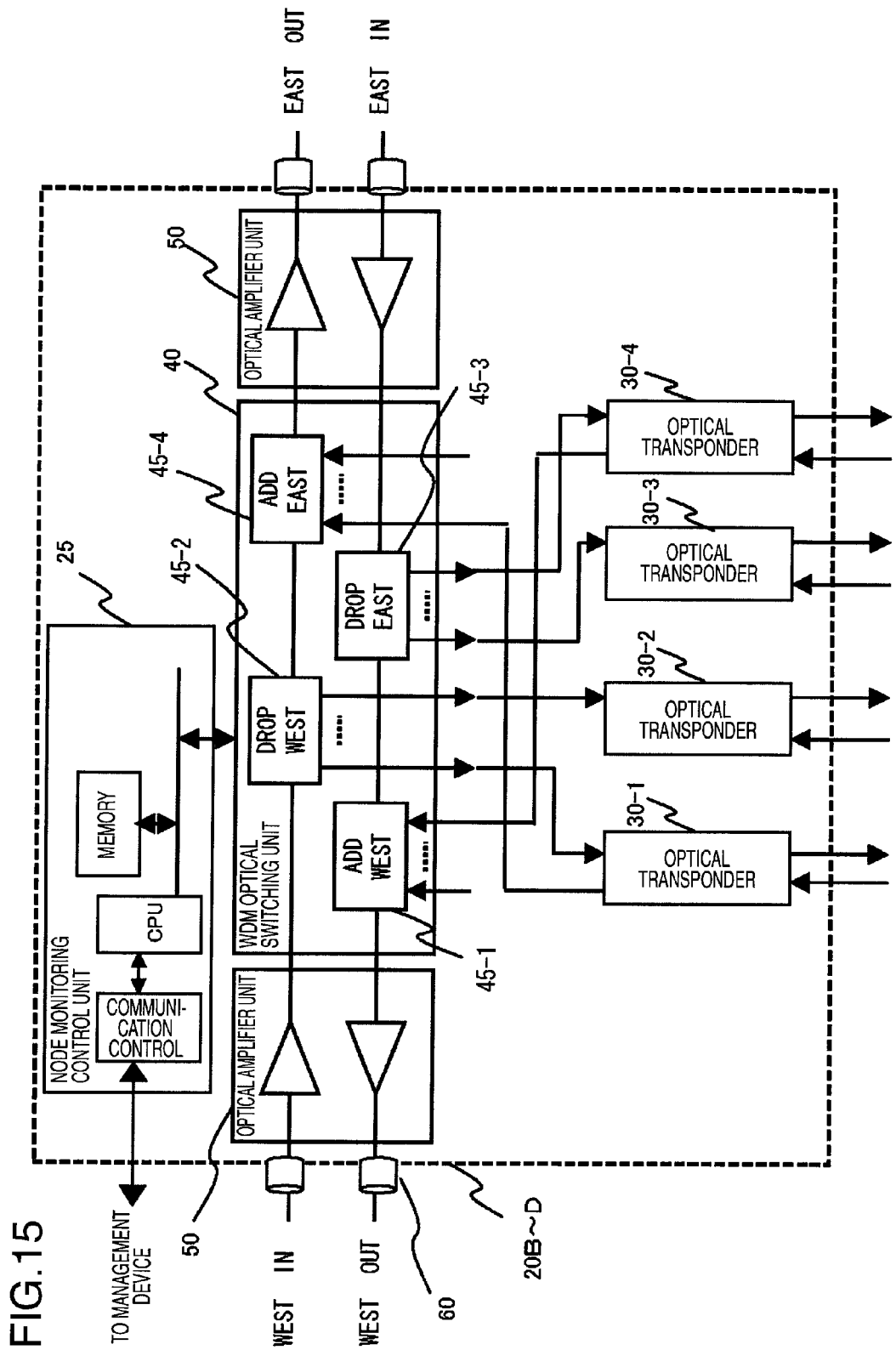
[FIG. 15] A configuration diagram of optical nodes 20B to D in the third embodiment.
Figure 16:
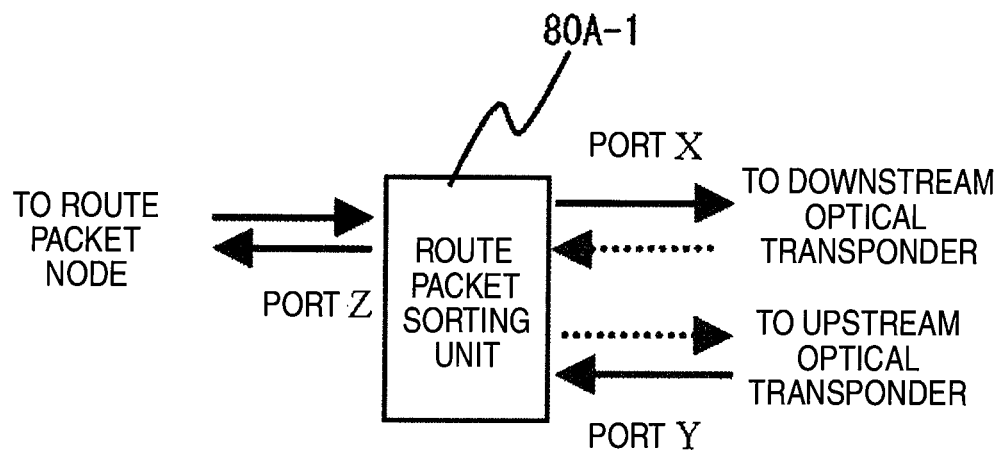
[FIG. 16] An operation outline of the route packet sorting unit in the third embodiment.
Figure 17:
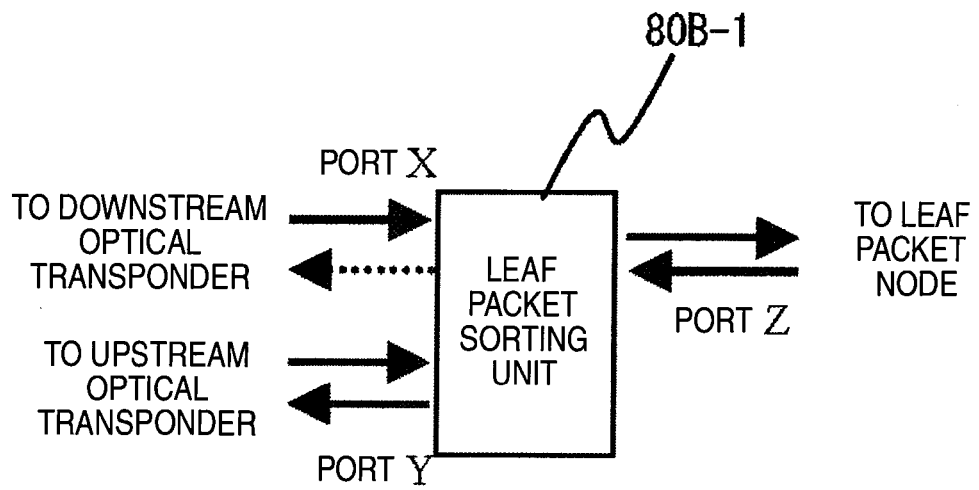
[FIG. 17] An operation outline of the leaf packet sorting unit in the third embodiment.
Figure 18:
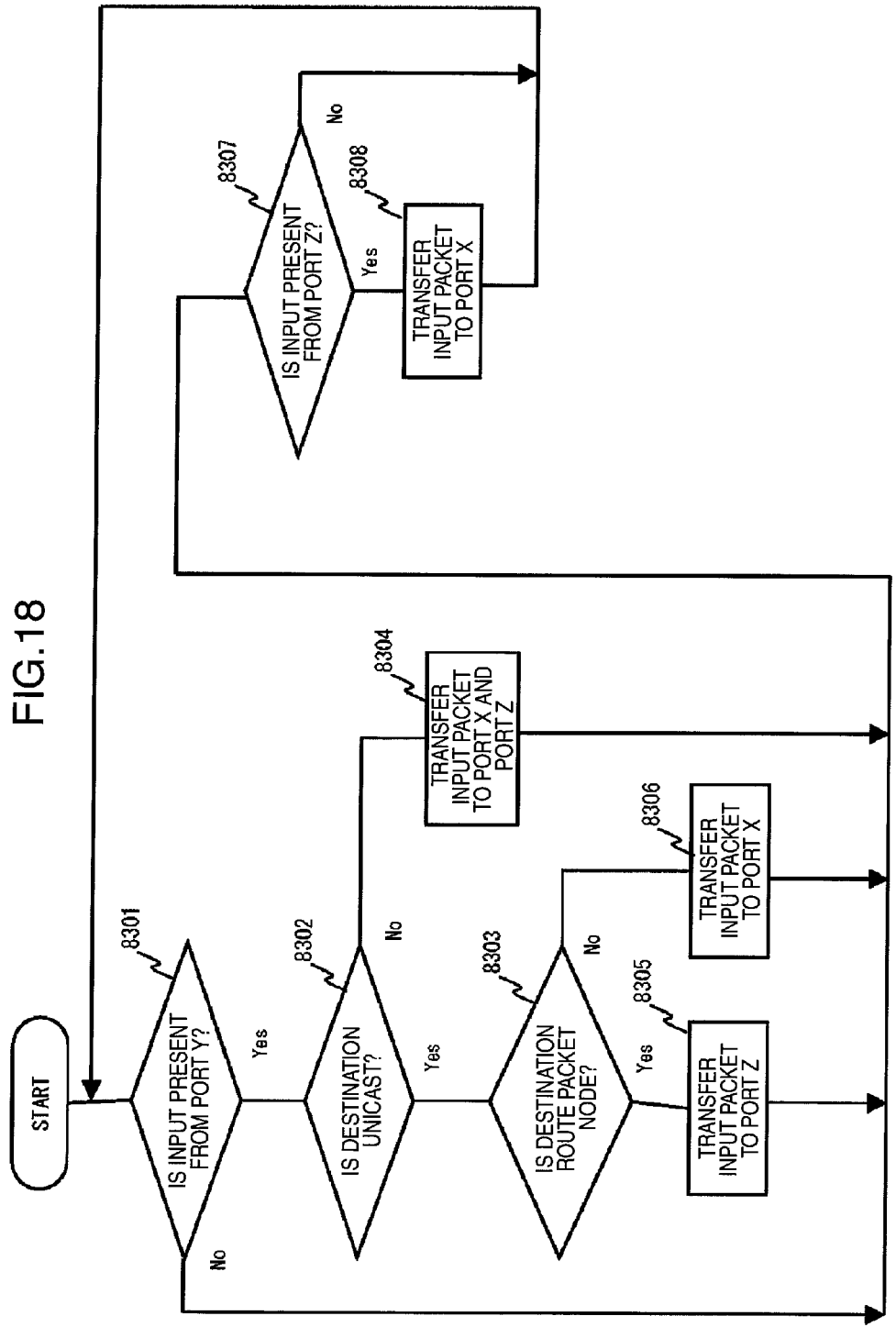
[FIG. 18] A flowchart of the process of the route packet sorting unit in the third embodiment.
Figure 19:
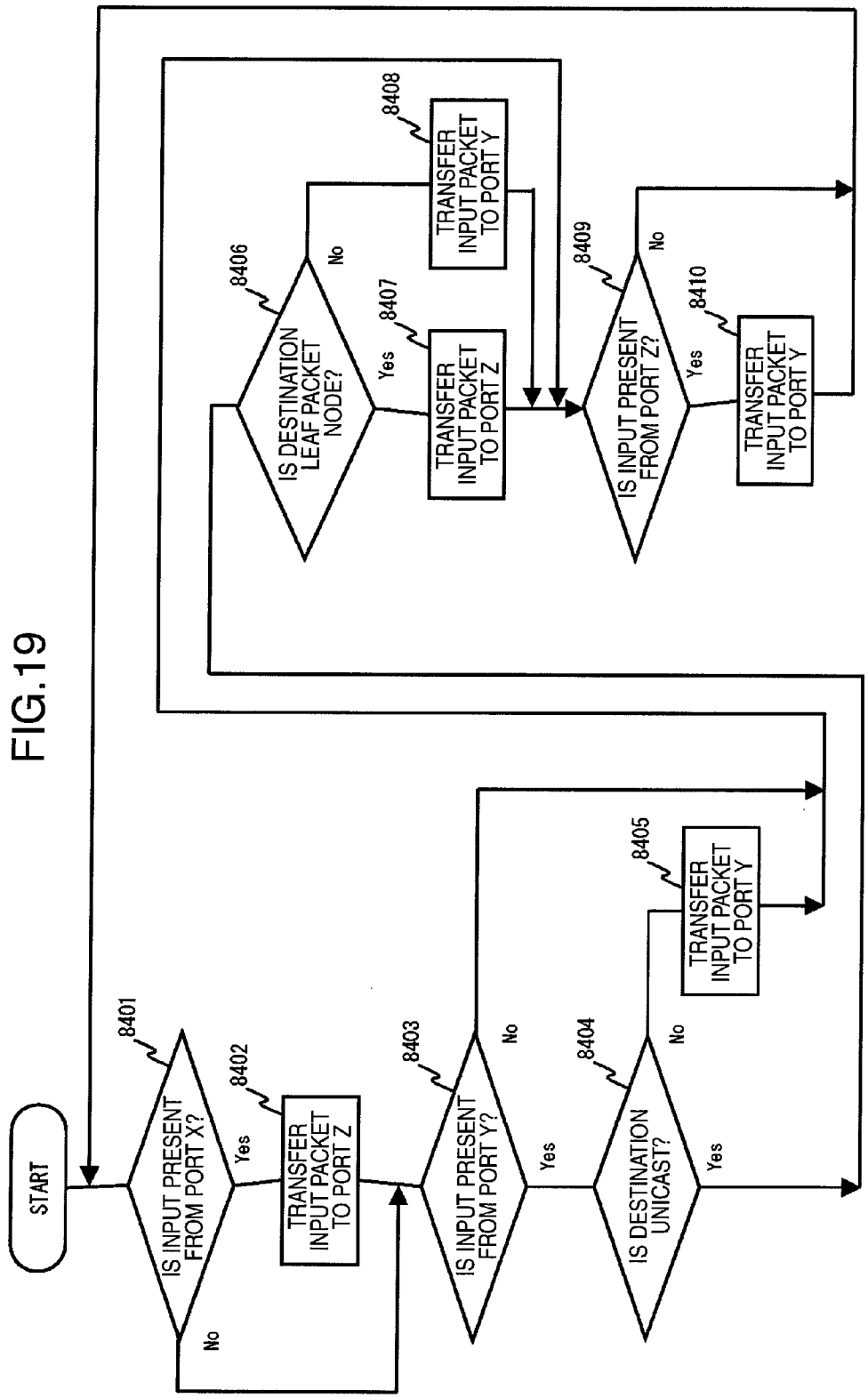
[FIG. 19] A flowchart of the leaf packet sorting unit in the third embodiment.

The invention claimed is:
1. A packet transfer system, comprising:
a plurality of optical nodes which constitute a ring optical network, the ring optical network including a first transmission path which is configured to transmit signals in one direction and a second transmission path which is configured to transmit signals in the other direction; and
a plurality of packet transfer devices, each of which is connected to one of the optical nodes and is configured to transfer a packet between the connected optical node and a packet node which transmits and receives a packet,
wherein each optical node located in the middle of the first and second transmission paths
is configured to drop a signal received from the first transmission path to the packet transfer device while passing the signal to other downstream optical node, and
to drop a signal received form the second transmission path to the packet transfer device,
wherein each packet transfer device connected to each of the optical nodes located in the middle of the first and second transmission paths
is configured to transfer the signal received and dropped by the optical node from the first transmission path to the packet node, and
when the signal received and dropped by the optical node from the second transmission path is a unicast packet and a destination of the packet is the packet node is configured to transfer the received unicast packet to the packet node, and when the signal received and dropped by the optical node from the second transmission path is a unicast packet and a destination of the packet is not the packet node, is configured to transfer the received unicast packet to the optical node, wherein the optical node located at a starting point of the first transmission path and an end point of the second transmission path is configured to drop a signal received from the second transmission path to the packet transfer device, and is configured to add a signal received form the packet transfer device to the first transmission path, wherein the packet transfer device connected to the optical node located at a starting point of the first transmission path and an end point of the second transmission path, when the signal received and dropped from the second transmission path by the optical node is a unicast packet and a destination of the packet is the packet node, is configured to transfer the received unicast packet to the packet node, and when the signal received and dropped from the second transmission path is a unicast packet and a destination of the packet is not the packet node, to transfer the received unicast packet to the optical node, and when the packet received and dropped from the second transmission path is not a unicast packet, to transfer the received packet to the packet node and the optical node.

2. The packet transfer system according to claim 1, wherein, when the packet received and dropped from the second transmission path is not a unicast packet, the packet transfer device is configured to transfer the packet to the optical node.

3. The packet transfer system according to claim 1, wherein the packet transfer system is configured to transfer the packet received from the packet node to the optical node, and the optical node is configured to add the packet received from the packet transfer device to the second transmission path.

4. The packet transfer system according to claim 1, wherein the optical node located at an end point of the first transmission path and a starting point of the second transmission path is configured to drop a signal received from the first transmission path to the packet transfer device and to not pass the signal to other optical node in the first transmission path, and is configured to add a signal received from the packet transfer device to the second transmission path.

* * * * *